(12) United States Patent
Roberts et al.

(10) Patent No.: US 11,539,394 B2
(45) Date of Patent: Dec. 27, 2022

(54) SELF-INTERFERENCE MITIGATION IN IN-BAND FULL-DUPLEX COMMUNICATION SYSTEMS

(71) Applicant: GENXCOMM, INC., Austin, TX (US)

(72) Inventors: Ian P. Roberts, Austin, TX (US);
Hardik B. Jain, Austin, TX (US);
Sriram Vishwanath, Austin, TX (US);
Yitao Chen, San Diego, CA (US);
Rajesh K. Mishra, Austin, TX (US);
Dan Schwartz, Scottsdale, AZ (US)

(73) Assignee: GENXCOMM, INC., Austin, TX (US)

(*) Notice: Subject to any disclaimer, the term of this patent is extended or adjusted under 35 U.S.C. 154(b) by 40 days.

(21) Appl. No.: 17/079,360

(22) Filed: Oct. 23, 2020

(65) Prior Publication Data

US 2021/0126669 A1     Apr. 29, 2021

Related U.S. Application Data

(60) Provisional application No. 62/967,425, filed on Jan. 29, 2020, provisional application No. 62/940,532, (Continued)

(51) Int. Cl.
*H04B 1/52* (2015.01)
*H04B 1/525* (2015.01)
(Continued)

(52) U.S. Cl.
CPC ............. *H04B 1/525* (2013.01); *H04B 1/123* (2013.01); *H04B 7/0617* (2013.01); *H04B 15/02* (2013.01); *H04L 5/14* (2013.01)

(58) Field of Classification Search
CPC ...... H04B 1/525; H04B 1/123; H04B 7/0617; H04B 15/02; H04L 5/14; H04L 5/0023; H04L 5/0057; H04L 5/1461
See application file for complete search history.

(56) References Cited

U.S. PATENT DOCUMENTS

| 4,608,569 A | 8/1986 | Dickey, Jr. et al. |
| 5,377,289 A | 12/1994 | Johnson |

(Continued)

FOREIGN PATENT DOCUMENTS

| CN | 101379718 | 3/2009 |
| CN | 104484852 | 4/2015 |

(Continued)

OTHER PUBLICATIONS

Chang et al., "Full-duplex spectrum sensing in cognitive radios using optical self-interference cancellation," 2015 9th International Conference on Sensing Technology (ICST), IEEE, pp. 341-344, Dec. 8, 2015.

(Continued)

*Primary Examiner* — Steven H Nguyen
(74) *Attorney, Agent, or Firm* — Brownstein Hyatt Farber Schreck, LLP

(57) ABSTRACT

A system and method for mitigating self-interference in mmWave systems. A transceiver can include a mutual precoder controller that controls both an analog/RF beamforming circuit and a digital/BB beamforming circuit to prefer beams directed along paths in the local RF environment that minimize self-interference. In other cases, a transceiver can include one or more self-interference filters to internally mitigate self-interference.

12 Claims, 11 Drawing Sheets

Related U.S. Application Data filed on Nov. 26, 2019, provisional application No. 62/927,673, filed on Oct. 29, 2019, provisional application No. 62/972,523, filed on Oct. 29, 2019.

(51) Int. Cl.
*H04L 5/14* (2006.01)
*H04B 7/06* (2006.01)
*H04B 15/02* (2006.01)
*H04B 1/12* (2006.01)

(56) References Cited

U.S. PATENT DOCUMENTS

| | | |
|---|---|---|
| 5,444,864 A | 8/1995 | Smith |
| 5,578,845 A | 11/1996 | Yoshiyuki et al. |
| 5,699,176 A | 12/1997 | Cohen |
| 5,701,371 A | 12/1997 | Ishida |
| RE35,736 E | 2/1998 | Powell |
| 5,757,312 A | 5/1998 | Szmurlo |
| 5,867,293 A | 2/1999 | Kotten |
| 5,904,546 A | 5/1999 | Wood et al. |
| 6,359,714 B1 | 3/2002 | Imajo |
| 6,373,909 B2 | 4/2002 | Lindquist |
| 6,507,728 B1 | 1/2003 | Watanabe |
| 6,539,204 B1 | 3/2003 | Marsh |
| 6,567,648 B1 | 5/2003 | Ahn |
| 6,567,649 B2 | 5/2003 | Souissi |
| 6,745,018 B1 | 6/2004 | Zehavi |
| 6,751,447 B1 | 6/2004 | Jin |
| 6,760,454 B1 | 7/2004 | Shreve |
| 6,771,931 B2 | 8/2004 | Waltho |
| 6,778,319 B2 | 8/2004 | Chavez-Pirson |
| 6,873,639 B2 | 3/2005 | Zhang |
| 6,907,093 B2 | 6/2005 | Blount |
| 6,999,639 B2 | 2/2006 | Tsarev |
| 7,020,396 B2 | 3/2006 | Izadpanah |
| 7,058,368 B2 | 6/2006 | Nicholls |
| 7,064,697 B2 | 6/2006 | Taylor et al. |
| 7,085,497 B2 | 8/2006 | Tiemann |
| 7,116,484 B2 | 10/2006 | Nemoto |
| 7,123,676 B2 | 10/2006 | Gebara |
| 7,130,289 B2 | 10/2006 | Kuan et al. |
| 7,355,993 B2 | 4/2008 | Adkins |
| 7,366,244 B2 | 4/2008 | Gebara |
| 7,446,601 B2 | 11/2008 | LeChevalier |
| 7,496,257 B2 | 2/2009 | Levner |
| 7,509,054 B2 | 3/2009 | Calabro et al. |
| 7,566,634 B2 | 7/2009 | Beyne et al. |
| 7,650,080 B2 | 1/2010 | Yap |
| 7,660,531 B2 | 2/2010 | Lee |
| 7,672,643 B2 | 3/2010 | Loh |
| 7,680,368 B2 | 3/2010 | Welch et al. |
| 7,711,329 B2 | 5/2010 | Aparin |
| 7,720,029 B2 | 5/2010 | Orava |
| 7,729,431 B2 | 6/2010 | Gebara |
| 7,756,480 B2 | 7/2010 | Loh |
| 7,778,611 B2 * | 8/2010 | Asai ............... H04B 1/525 455/78 |
| 7,809,047 B2 | 10/2010 | Kummetz |
| 7,826,808 B2 | 11/2010 | Faulkner |
| 7,853,195 B2 | 12/2010 | Higgins |
| 7,869,527 B2 | 1/2011 | Vetter |
| 7,876,867 B2 | 1/2011 | Filipovic |
| 7,907,895 B2 | 3/2011 | Shinagawa |
| 7,917,177 B2 | 3/2011 | Bauman |
| 8,036,606 B2 | 10/2011 | Kenington |
| 8,055,235 B1 | 11/2011 | Gupta et al. |
| 8,078,130 B2 | 12/2011 | Fudge |
| 8,081,946 B2 | 12/2011 | Fudge |
| 8,098,779 B2 | 1/2012 | Komninakis et al. |
| 8,155,605 B2 | 4/2012 | Hwang |
| 8,170,487 B2 | 5/2012 | Sahota et al. |
| 8,233,872 B2 | 7/2012 | Nagai |
| 8,249,540 B1 | 8/2012 | Gupta |
| 8,270,843 B2 | 9/2012 | Nakamoto |
| 8,299,555 B2 | 10/2012 | Su et al. |
| 8,320,504 B2 | 11/2012 | Peng |
| 8,331,509 B2 | 12/2012 | Wang |
| 8,351,874 B2 | 1/2013 | Dent |
| 8,477,871 B2 | 7/2013 | Neumann |
| 8,521,090 B2 | 8/2013 | Kim |
| 8,526,903 B2 | 9/2013 | Gudem |
| 8,565,681 B2 | 10/2013 | Kim |
| 8,600,200 B1 | 12/2013 | Rakich et al. |
| 8,618,966 B2 | 12/2013 | Kanter |
| 8,682,170 B2 | 3/2014 | Prucnal |
| 8,693,810 B2 | 4/2014 | Suarez et al. |
| 8,730,786 B2 | 5/2014 | Wang |
| 8,781,030 B2 | 7/2014 | Peng |
| 8,785,332 B2 | 7/2014 | Johnson et al. |
| 8,805,298 B2 | 8/2014 | McCallister |
| 8,845,854 B2 | 9/2014 | Lei et al. |
| 8,867,928 B2 | 10/2014 | Piehler |
| 8,872,583 B2 | 10/2014 | Lee |
| 8,971,712 B2 | 3/2015 | Fan et al. |
| 8,977,223 B1 | 3/2015 | Gupta |
| 9,020,307 B2 | 4/2015 | Ishikawa |
| 9,077,440 B2 | 7/2015 | Wyville |
| 9,100,099 B2 | 8/2015 | Loh |
| 9,106,453 B2 | 8/2015 | Wang |
| 9,160,386 B2 | 10/2015 | Rimini |
| 9,178,635 B2 | 11/2015 | Ben-Shlomo |
| 9,184,902 B2 | 11/2015 | Khojastepour |
| 9,195,052 B2 | 11/2015 | Long |
| 9,214,718 B2 | 12/2015 | Mow |
| 9,224,650 B2 | 12/2015 | Lei et al. |
| 9,252,857 B2 | 2/2016 | Negus |
| 9,253,003 B1 | 2/2016 | Harel |
| 9,257,811 B2 | 2/2016 | Gao |
| 9,258,052 B2 | 2/2016 | George |
| 9,268,092 B1 | 2/2016 | Jarecki, Jr. |
| 9,312,895 B1 | 4/2016 | Gupta |
| 9,344,125 B2 | 5/2016 | Kpodzo |
| 9,344,139 B2 | 5/2016 | Sjoland |
| 9,385,268 B2 | 7/2016 | Minamiru et al. |
| 9,391,667 B2 | 7/2016 | Sundstrom |
| 9,438,288 B2 | 9/2016 | Feld |
| 9,450,623 B2 | 9/2016 | Weissman |
| 9,490,963 B2 | 11/2016 | Choi |
| 9,520,985 B2 | 12/2016 | Choi |
| 9,571,205 B1 | 2/2017 | Suarez |
| 9,589,812 B2 | 3/2017 | Takahashi et al. |
| 9,602,149 B1 | 3/2017 | Tanzi |
| 9,608,718 B2 | 3/2017 | Monsen |
| 9,651,652 B2 | 5/2017 | Kpodzo et al. |
| 9,667,404 B2 | 5/2017 | Sjoland |
| 9,696,492 B1 | 7/2017 | Cox |
| 9,698,913 B2 | 7/2017 | Foster |
| 9,703,056 B2 | 7/2017 | Neelakantan et al. |
| 9,712,233 B1 | 7/2017 | Deng |
| 9,722,713 B2 | 8/2017 | Tanzi |
| 9,723,612 B2 | 8/2017 | Stapleton |
| 9,726,821 B2 | 8/2017 | Murray et al. |
| 9,735,056 B2 | 8/2017 | Takahashi et al. |
| 9,748,906 B2 | 8/2017 | Stewart |
| 9,768,852 B2 | 9/2017 | Ling |
| 9,774,364 B2 | 9/2017 | Shih |
| 9,775,123 B2 | 9/2017 | Harel |
| 9,793,943 B2 | 10/2017 | Sjoland |
| 9,793,992 B2 | 10/2017 | Hino |
| 9,807,700 B2 | 10/2017 | Harel |
| 9,831,898 B2 | 11/2017 | Pratt |
| 9,847,258 B2 | 12/2017 | Rohleder et al. |
| 9,871,552 B2 | 1/2018 | Din |
| 9,885,806 B2 | 2/2018 | Steinhardt |
| 9,885,825 B2 | 2/2018 | Kopp |
| 9,900,044 B2 | 2/2018 | Sjoland |
| 9,923,593 B2 | 3/2018 | Andersson |
| 9,923,708 B2 | 3/2018 | Khandani |
| 9,948,377 B1 * | 4/2018 | Kim ............... H04B 7/0617 |
| 9,960,805 B2 | 5/2018 | Wyville |
| 9,960,850 B2 | 5/2018 | Daniel |
| 9,973,282 B2 | 5/2018 | Welch |

(56) References Cited

U.S. PATENT DOCUMENTS

| | | |
|---|---|---|
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Sim et al. |
| 10,084,506 B2 | 9/2018 | Sjoland |
| 10,110,306 B2 | 10/2018 | Jain et al. |
| 10,177,836 B2 | 1/2019 | Hong |
| 10,187,158 B2 | 1/2019 | Kikuchi |
| 10,191,217 B2 | 1/2019 | Boutami |
| 10,257,746 B2 | 4/2019 | Jain et al. |
| 10,321,357 B1 | 6/2019 | Jain et al. |
| 10,325,861 B2 | 6/2019 | Miccoli |
| 10,341,028 B2 | 7/2019 | Kanter |
| 10,356,782 B2 | 7/2019 | Negus |
| 10,367,584 B2 | 7/2019 | Rakich |
| 10,418,775 B2 | 9/2019 | Gao |
| 10,491,313 B2 | 11/2019 | Jain |
| 10,656,350 B2 | 5/2020 | Chen et al. |
| 10,663,663 B2 | 5/2020 | Painchaud |
| 10,673,519 B2 | 6/2020 | Hong |
| 10,727,945 B1 | 7/2020 | Nguyen et al. |
| 10,754,091 B1 | 8/2020 | Nagarajan |
| 10,873,877 B2 | 12/2020 | Jain et al. |
| 11,032,005 B2 | 6/2021 | Vishwanath et al. |
| 11,032,737 B2 | 6/2021 | Jain et al. |
| 2003/0161637 A1 | 8/2003 | Yamamoto |
| 2004/0151238 A1 | 8/2004 | Masenten |
| 2004/0264610 A1 | 12/2004 | Marro |
| 2011/0065408 A1 | 3/2011 | Kenington |
| 2011/0065409 A1 | 3/2011 | Kenington |
| 2011/0134810 A1 | 6/2011 | Yamamoto et al. |
| 2013/0295980 A1 | 11/2013 | Reuven |
| 2014/0169236 A1 | 6/2014 | Choi |
| 2014/0177660 A1 | 6/2014 | Elmaanaoui |
| 2015/0078217 A1* | 3/2015 | Choi ............... H04B 1/525 370/278 |
| 2016/0103341 A1 | 4/2016 | Long |
| 2017/0111930 A1* | 4/2017 | Rajagopal ........... H04W 74/006 |
| 2017/0170999 A1* | 6/2017 | Zhou ................ H04B 1/123 |
| 2017/0176780 A1 | 6/2017 | Levy et al. |
| 2017/0264347 A1* | 9/2017 | Le-Ngoc ............. H04B 7/0626 |
| 2018/0006795 A1 | 1/2018 | Raaf |
| 2018/0131423 A1* | 5/2018 | Park ................ H04L 25/03891 |
| 2018/0248627 A1 | 8/2018 | Daniel |
| 2020/0209476 A1 | 7/2020 | Mattis et al. |
| 2020/0304253 A1* | 9/2020 | Choi ................ H04B 7/0617 |
| 2021/0036779 A1 | 2/2021 | Nguyen et al. |
| 2021/0088724 A1 | 3/2021 | Liu et al. |
| 2021/0153073 A1 | 5/2021 | Hain et al. |
| 2021/0297156 A1 | 9/2021 | Jain et al. |
| 2021/0336050 A1 | 10/2021 | Mattis et al. |
| 2022/0043211 A1 | 2/2022 | Mattis et al. |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2004048200 | 2/2004 |
| JP | 2006301415 | 11/2006 |
| JP | 2011120120 | 6/2011 |
| JP | 2013110510 | 6/2013 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

IBM, "Silicon Nanophotonic Packaging," https://researcher.watson.ibm.com/researcher/view_group_subpage.php?id=5522, Jul. 2016.

Li et al., "Multimode silicon photonics," Nanophotonics, vol. 8, No. 2, pp. 227-247, May 16, 2019.

Mothe et al., "Multichannel Microwave Photonics Signals Summation Device," IEEE *Photonics Technology Letters*, vol. 3, No. 3, pp. 140-142, Feb. 1, 2011.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," *Journal of Lightwave Technology*, vol. 34, No. 20, pp. 4715-4721, Oct. 15, 2016.

Yoo et al., "Heterogeneous 2D/3D photonic integrated microsystems," *Microsystems & Nanoengineering*, 2, 16030, Aug. 2016.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

Lecture 150—Phase Noise—I (Jun. 20, 2003), P.E. Allen 2003, 2 pages.

Skyworks AN279, "Estimating Period Jitter from Phase Noise," Skyworks Solutions, Inc., Sep. 21, 2021, 8 pages.

Kwak, MyoungJun, "The Impact of Loop Filter in Phase Locked Loop," Bachelor's Thesis Metropolia University of Applied Sciences, Feb. 19, 2019, 50 pages.

* cited by examiner

SELF-INTERFERENCE MITIGATION IN IN-BAND FULL-DUPLEX COMMUNICATION SYSTEMS

CROSS-REFERENCE TO RELATED APPLICATION(S)

This application is a non-provisional application claiming priority under 35 U.S.C. § 119 to U.S. Provisional Patent Application No. 62/927,673 filed Oct. 29, 2019, entitled "Frequency-Selective Beamforming Cancellation Design for Millimeter-Wave Full-Duplex," and to U.S. Provisional Patent Application No. 62/967,425 filed Jan. 29, 2020, entitled "Equipping Millimeter-Wave Full-Duplex with Analog Self-Interference Cancellation," and to U.S. Provisional Patent Application No. 62/940,532 filed Nov. 26, 2019, entitled "Enabling In-Band Coexistence of Millimeter-Wave Communication and Radar," and to U.S. Provisional Patent Application No. 62/927,523 filed Oct. 29, 2019, entitled "MIMO Full Duplex Radios with Deep Learning," the contents of which are incorporated by reference in their entirety.

TECHNICAL FIELD

Embodiments described herein relate to wireless communication systems and, in particular, to full-duplex wireless communications systems configured to mitigate and/or cancels self-interference.

BACKGROUND

Many modern wireless communication systems, such as fifth-generation cellular ("5G") and 60 GHz Wi-Fi ("Wi-Gig") are designed to leverage historically unused spectrum between 30 GHz to 300 GHz, often referred to as millimeter wave or "mmWave" frequencies. Although such frequencies are relatively unused—and, thus, substantial theoretical bandwidth is available—free space path losses between devices communicating over these frequencies present a substantial challenge for practical and scalable implementations of such systems.

Beamforming, and in particular hybrid digital/analog beamforming, is one technique used to overcome high path losses between base stations and user equipment in mmWave systems. However, as with previous generation wireless communication systems, mmWave systems are fundamentally half-duplex with respect to time and/or frequency resources. More particularly, conventional and proposed mmWave systems are specifically designed to time and/or frequency duplex operation of transmit and receive circuitry in order to avoid self-interference (e.g., power output from transmit circuitry that is absorbed by the receive circuitry of the same transceiver device).

As such, by definition and design, conventional and proposed mmWave systems are only able to operate at half of the theoretical maximum capacity that an in-band full-duplex architecture could achieve.

SUMMARY

Embodiments described herein take the form of a wireless transceiver for an in-band full duplex radio frequency ("RF") communication system. In such constructions, the wireless transceiver includes a transmit side, a receive side, and a controller.

The transmit side includes a digital input receiving a first data stream as input, a first precoder receiving the data stream as input, a digital to analog converter receiving output of the first precoder as input, a first RF chain receiving output of the digital to analog converter as input, a second precoder receiving output of the RF chain as input, and a first antenna array receiving output of the second precoder as input and configured to emit RF energy into a local RF environment.

The receive side of the transceiver includes a second antenna array receiving RF energy from the local RF environment, a first combiner receiving the received RF energy as input, a second RF chain receiving output of the first combiner as input, an analog to digital converter receiving output of the second RF chain as input, a second combiner receiving output of the analog to digital converter as input, and a digital output receiving output of the second combiner as input and configured to provide a second data stream as output.

The controller of the transceiver provides configuration parameters to both the first precoder and the second precoder based on channel state information. Specifically, the configuration parameters are configured to minimize the RF energy emitted by the first antenna array that returns to the second antenna array.

Embodiments may include a self-interference cancellation filter coupling output of the second precoder to input of the first combiner. In other constructions, a second self-interference filter can also be included coupling output of the first precoder to input of the second combiner.

Embodiments may include a configuration in which the first self-interference cancellation filter cancels a first portion of self-interference and the second self-interference cancellation filter cancels a second portion of self-interference (also referred to as "residual" self-interference).

Related and additional embodiments may include a configuration in which the controller is configured (in some cases, leveraging a trained predictive model) to apply second configuration parameters to the first self-interference cancellation filter and the second self-interference cancellation filter. In such constructions, the second configuration parameters are configured to minimize the RF energy emitted by the first antenna array that returns to the second antenna array and may be received at the first combiner.

Some embodiments may include a configuration in which the controller is configured to access a codebook to provide configuration parameters to the second precoder.

Many embodiments include a configuration in which RF energy is emitted into the local RF environment at a frequency between 30 GHz and 300 GHz, also referred to as millimeter wave, or mmWave. However, it may be appreciated that this is merely one example; one of skill in the art will readily appreciate that other frequency bands, including lower frequencies such as 500-1000 MHz and/or 1 GHz to 30 GHz may be used. Broadly, the techniques and systems described herein can be suitably modified to operate in any suitable band.

Additional embodiments described herein take the form of a system of RF devices. The system includes a first transceiver (in some cases, a radar transceiver, an RF jamming system, or an electronic warfare system) having a first transmit side with a first transmit side antenna array and a first receive side with a first receive side antenna array. The system also includes a second transceiver having a second transmit side with a baseband precoder, an RF precoder, and a second transmit side antenna array. The second transceiver also includes a second receive side with a second receive side antenna array. In addition, as with other constructions described herein, the second transceiver includes a controller providing configuration parameters to both the baseband precoder and the RF precoder based on channel state information, the configuration parameters configured to minimize the RF energy emitted by the second transmit side antenna array that returns to the first receive side antenna array and the second receive side antenna array.

Related and additional embodiments may include a configuration in which the first receive side antenna array is co-located with the second receive side antenna array.

Related and additional embodiments may include a configuration in which the configuration parameters are configured to minimize the RF energy emitted by the second transmit side antenna array that returns to the first receive side antenna array.

Related and additional embodiments may include a configuration in which the first transceiver and the second transceiver are configured to operate in the same band.

Embodiments described herein take the form of a method of operating a wireless transceiver for an in-band full duplex radio frequency ("RF") communication system, the method including the operations of: receiving channel state information; determining first configuration parameters for a baseband precoder of the wireless transceiver based on the channel state information, the first configuration parameters configured to minimize self-interference received at a receive antenna of the wireless transceiver; determining second configuration parameters for an RF precoder of the wireless transceiver based on the channel state information, the second configuration parameters configured to minimize self-interference received at the receive antenna of the wireless transceiver; and applying the first and second configuration parameters to the baseband precoder and the RF precoder, respectively.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
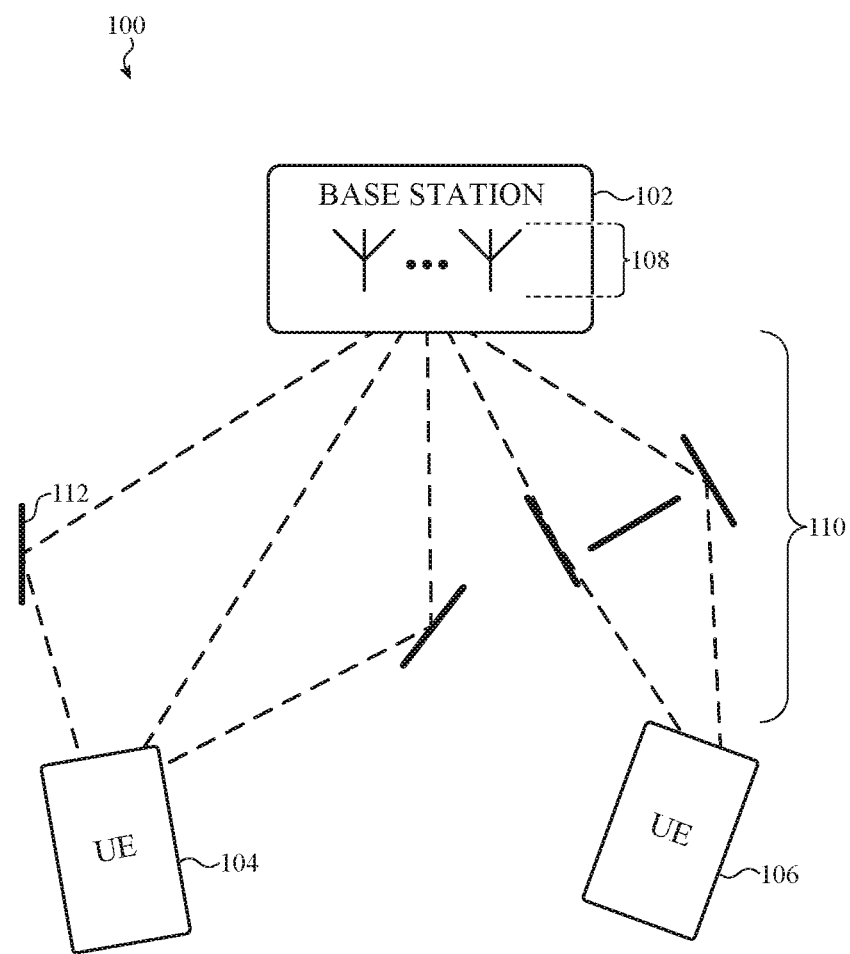
FIG. 1 is a simplified system diagram of a mmWave communication system, such as described herein.

Certain accompanying figures include vectors, rays, traces and/or other visual representations of one or more example paths—which may include reflections, refractions, diffractions, and so on, through one or more mediums—that may be taken by, or may be presented to represent, one or more photons, wavelets, or other propagating electromagnetic energy originating from, or generated by, one or more antennas or emitting elements shown or, or in some cases, omitted from, the accompanying figures. It is understood that these simplified visual representations of electromagnetic energy regardless of spectrum (e.g., radio, microwave, VHF, UHF, mmWave, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to in-band full-duplex communications systems that operate to exchange digital information between two or more transceiver devices across one or more millimeter wavelength frequencies ("mmWave").

As used herein, the term "transceiver device" can refer to any suitable electronic device or set of electronic devices configured to both transmit and receive wireless communications over mmWave frequencies (e.g., in the range of 30 GHz-300 GHz). Example transceiver devices can include base station devices, access point devices, radio head units, user equipment ("UE"), point-to-point devices, and the like. Example UE transceiver devices can include personal or industrial telecommunications devices, which may be stationary or mobile. Examples include but are not limited to: cellular phones; tablet computers; laptop computers; vehicle communications devices; modems; Internet-of-Things devices; home or industrial automation devices; home or business internet access devices; and so on. In other cases, the systems and methods described herein can be leveraged by half-duplex devices, such as transmitters, receivers, radio/communications jamming systems, mmWave/GHz active denial systems/crowd control systems, warfare systems, and so on.

For simplicity of description, many embodiments that follow reference a base station transceiver device configured to communicate with UE, such as a cellular phone. It may be appreciated, however, that this is merely one example configuration of two transceiver devices communicably coupled, as described herein; any suitable device or pair of devices can be configured to leverage the systems, methods, and architectures described herein.

As noted above, transceiver devices described herein can be configured for in-band full duplex communication across mmWave frequencies. As used herein, the term "in-band" refers to receiving and transmitting over at least partially overlapping bandwidths. In some cases, carrier/center frequencies of a particular channel may be the same, but this is not necessarily required. For example, in some embodiments, overlapping bandwidth of adjacent channels can be referred to as "in-band" systems.

More specifically, embodiments described herein relate to transceiver devices, and methods for operating the same, configured to cancel or otherwise mitigate (or minimize) effects of self-interference in either or both the radio frequency ("RF") domain or the baseband domain ("BB"), thereby supporting simultaneous, non-duplexed, operation of both transmit and receive circuitry in the same transceiver device operating at mmWave frequencies.

As a result of architectures described herein, two communicably coupled mmWave transceiver devices (e.g., a cellular phone and a base station) can communicate at substantially higher speeds than conventional mmWave transceiver devices configured for half-duplex operation.

In a simpler, non-limiting phrasing, it may be appreciated that conventional wireless communications devices operate transmitter circuitry only when receiver circuitry is not operating. This duplexing technique prevents power output from the transmitter from being absorbed by the receiver and potentially (1) damaging sensitive receiver electronics and/or (2) overpower signal(s) transmitted by a separate transceiver device. By contrast, embodiments described herein are configured to adaptively filter self-interference (in either or both BB and RF domains) so that transmitter circuitry and receiver circuitry can operate simultaneously within the same bands.

As may be appreciated, and as noted above, mmWave communications systems—including those systems described and referenced herein—typically include multiple antenna elements (which may be used for either or both transmitting signals and receiving signals) that are operated with one or more BB or RF beamforming techniques in order to overcome challenges introduced by substantial path losses associated with operating at mmWave frequencies.

For example, a base station can be configured to communicate with a UE. The base station can include an array of antenna elements sized, oriented, and distributed suitably to transmit and receive at mmWave frequencies. A data stream can be received by the base station as input. The data stream (the BB signal) can be converted to an analog signal (encoded according to any suitable methodology) and modulated over a carrier frequency within the mmWave band. The resulting modulated signal is an RF signal that can be supplied as input to one or more of the antenna elements of the array of antenna elements. In particular, by controlling the amplitude and/or phase of a particular RF signal applied as input to a particular antenna element (or subarray of antenna elements) of the array, a main lobe of RF energy, also referred to as a "beam, emitted from the array can be "steered" in a particular direction, such as a direction along a path that terminates at the UE. In addition, as may be appreciated, side lobes emitted from the array (and/or nulls) can be likewise steered toward or away from other UE so that the data stream intended to be received by the UE does not, itself, cause interference with other UE within the same radio environment. This foregoing example is conventionally referred to as "analog beamforming," as the operation takes place in the analog/RF domain.

Collectively, information related to or otherwise describing the propagation of a signal from a transmitter to a receiver is referred to as "channel state information." In this manner, an analog beamforming operation can leverage channel state information to direct a main lobe of a lobe pattern along a path (either direct or indirect; a path may be line-of-sight, or may include one or more reflections from one or more RF-reflective surfaces in the local RF environment) that terminates at an intended receiver device and minimizes path losses (e.g., fading, power decay, scattering, and so on). In other cases, such as those described herein, channel state information can be leveraged to inform a beamforming operation optimized for other purposes and not only for minimizing path loss; as one example, beamforming can be optimized to minimize self-interference effects. Such example configurations and architectures are described in greater detail below.

Channel state information can be obtained and/or determined or estimated in any number of suitable ways, as known by a person of skill in the art. As one example, a beamtraining operation can be performed by a pair of transceivers. As one simple example, a first transceiver can receive signal quality feedback from a second transceiver as either or both transceivers iterate through different beamforming configurations (e.g., different beam directions/orientations). In other examples, channel state information can be communicated along a different communication link (e.g., channel state information relating to an RF environment for cellular communications, such as mmWave can be communicated between transceiver devices via Wi-Fi, Bluetooth, over the open Internet, and so on). In yet other examples, a transceiver such as a base station may be positioned in a substantially stationary or fixed location. In such cases, baseline channel state information may be known or knowable. These foregoing examples are not exhaustive; it may be appreciated by one of skill in the art that channel state information can be determined and/or leveraged in a number of suitable ways.

In addition to, or in place of, analog beamforming, in other embodiments, a base station can be configured to digitally modify a data stream prior to conversion to an analog signal which, in turn, may be up-converted into an RF signal applied as input to one or more antenna elements or subarrays thereof. This foregoing example is conventionally referred to as "digital beamforming," as the operation takes place in the digital/BB domain. As with analog beamforming, digital beamforming can be informed by channel state information.

As may be appreciated, both analog and digital beamforming in mmWave communication systems have advantages and disadvantages. As such, many systems are implemented to support practical implementations of hybrid digital/analog beamforming techniques. Accordingly, and for the simplicity of description, the embodiments that follow reference transceivers configured to implement hybrid digital/analog beamforming to facilitate mmWave communications between transceivers, although it is appreciated that the systems and methods herein can be modified and/or otherwise configured to be used for other beamforming architectures as well.

In view of the foregoing, many embodiments described herein reference systems and methods to leverage hybrid digital/analog beamforming for self-interference cancellation in mmWave transceiver devices, thereby enabling a mmWave transceiver device to simultaneously transmit and receive using the same mmWave frequency bands/channels.

In particular, some embodiments described herein include one or more analog/RF domain self-interference cancellation ("SIC") filters that couple RF transmit signals to RF receive signals within a transceiver device, thereby mitigating self-interference effects. Such SIC filters can be configured to invert, phase shift, and/or otherwise modify the RF transmit signal (received as input to the filter) in order to effectively generate an inverse RF signal that, when injected into the receive chain, cancels self-interference effects. Many embodiments described herein reference systems and methods for configuring parameters, coefficients, and/or other operational characteristics of such filters.

In other embodiments, one or more digital domain SIC filters can be used. Such filters can be configured to tap, as input, a BB signal from transmit circuitry and to use that signal to effectively generate an inverse BB signal (whether digital or analog) that, when combined with the receive chain, cancels or compensates for one or more self-interference effects.

In many examples, a hybrid digital/analog beamforming architecture can include both a digital SIC filter and an analog SIC filter. In such examples, the two filters can be communicably coupled and/or otherwise configured to cooperate such that any interference not cancelled by the analog SIC filter in the analog domain can be canceled by the digital SIC filter in the digital domain.

Further embodiments described herein reference systems and methods for operating a hybrid digital/analog beamforming architecture to steer nulls toward antenna arrays used for receiving signals from other transceiver devices. In these constructions, signals transmitted by a transmit side antenna array can emit a beam formed with a main lobe directed to a path terminating at a target receiver device, and side lobes directed away from (and nulls directed toward) antennas used for receiving and/or directed away from other transceiver devices transmitting data to the transceiver. In this manner, a substantial portion of energy emitted from the transmitter side of the transceiver can be steered in a direction that presents a null over a receive side antenna array of the same transceiver. In this manner, more generally and broadly, beamforming may be used to cancel and/or mitigate effects of self-interference.

A person of skill in the art may further appreciate additional benefits realizable from the foregoing described construction. More particularly, such constructions can be configured as frequency-flat or frequency-selective.

For example, as may be appreciated, frequency-flat beamforming, such as typically achieved by analog beamforming implementations, may not be optimal in all environments as such constructions. More specifically, it may be readily appreciated that different frequencies may propagate through the same environment in different ways. As such, frequency-flat beamforming may not be optimal for all environments (or bandwidths or carrier frequencies), especially at short wavelengths, such as mmWave frequencies.

Accordingly, some embodiments described herein reference systems and methods for operating a hybrid digital/analog beamforming architecture as a frequency-selective zero-forcing transmitter (also referred to as null steering transmitter) configured to minimize self-interference on a per-frequency (e.g., per carrier) basis. In one construction, an orthogonal matching pursuit algorithm (or other optimization algorithm such as a gradient descent algorithm) can be used to select configuration parameters (e.g., filter coefficients) that define operations and behaviors of both digital beamforming electronics and analog beamforming electronics of the transceiver. In such examples, the orthogonal matching pursuit algorithm can be provided an analog beamforming codebook as input and may be configured to select digital beamforming parameters and a vector from the codebook that cooperatively optimize performance (and minimize self-interference) of the transceiver.

In yet further embodiments, self-cancellation filtering can be informed by and/or controlled by output from one or more trained predictive models or statistical inference machines or systems, such as a neural network. More generally and broadly, a trained predictive model can be leveraged to automatically cancel or otherwise mitigate multipath effects (e.g., echoes) resulting from full-duplex operation of a transceiver.

The foregoing example embodiments are mere examples of the various constructions or implementations of a system as described herein. In a more simple and non-limiting phrasing, the embodiments described herein are directed to various methods of mitigating effects of self-interference particular to mmWave system architectures. For example, beamforming can be used for self-interference mitigation, hardware (and/or software) self-interference cancellation filters can be used for self-interference mitigation, neural networks or other trained predictive models can be used for self-interference mitigation, and so on. Each of these techniques and structures can contribute to reductions in self-interference which, in turn, improves the performance of full-duplex in-band communications.

It may be appreciated that the systems and methods described herein can be leveraged for additional purposes beyond just self-interference cancellation. For example, as may be appreciated, some transceivers as described herein may be operated in environments with other devices operating in mmWave bands, such as radar systems. Further embodiments described herein reference constructions and architectures facilitating the co-operation of both mmWave radar systems and mmWave transceiver systems.

These foregoing and other embodiments are discussed below with reference to FIGS. 1-10. However, those skilled in the art will readily appreciate that the detailed description given herein with respect to these figures is for explanation only and should not be construed as limiting.

Generally and broadly, FIG. 1 depicts a simplified system diagram of a communications system as described herein. As noted above, a communications system as described herein is typically a wireless communications system including two or more transceiver devices configured to exchange information modulated over one or more carrier frequencies in the mmWave band of frequencies, which includes frequencies ranging from 30 GHz to 300 GHz. In many implementations, a system as described herein can be configured to communicate across frequencies from 30 GHz to 100 GHz, but this is not required and is merely one example.

Further, a person of skill in the art may readily appreciated that any number of suitable time division, frequency division, spatial division, or other spectrum sharing techniques can be utilized herein. Similarly, any suitable number of channels may be used, at any suitable channel width. In a more general phrasing, it may be appreciated that a wireless communications system as described herein need not specifically conform to any particular communications protocol; any suitable communications protocol or definition set may be used. A wireless communications system can include any suitable number of channels, spaced at any appropriate channel spacing, having any appropriate channel width, and so on.

Similarly, as noted above, transceiver devices that form portions of a wireless communication system as described herein can be implemented in a number of suitable ways. Example devices include base stations and UE, such as cellular phones. These are merely examples, and any suitable electronic devices can form a portion of a wireless communications system as described herein. For simplicity of description, the embodiments that follow reference an example construction in which a wireless communications system is implemented as a cellular network including a base station (a first transceiver) and a UE, cell phone (a second transceiver).

FIG. 1 depicts a simplified representation of such a system. In particular, FIG. 1 shows a wireless communication system 100 that includes a base station 102 that is configured to communicably couple to one or more UE, such as the portable electronic device 104 and/or the portable electronic device 106.

The portable electronic devices 104, 106 can be configured in any suitable manner and although depicted generally as cellular phones, it may be appreciated that this is merely one possible implementation. Further example electronic devices that can participate in the wireless communication system 100 and/or communicate directly or indirectly with the base station 102 (or, more generally, a transceiver) include any computing resource configured to send, consume, generate, and/or receive digital data. Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

For simplicity of description and illustration the portable electronic device 104 and the portable electronic device 106 are depicted as cellular phones; this is merely one example.

In particular, the base station 102 includes an antenna array 108 that can include multiple individual antenna elements. Some of the antenna elements may be dedicated to transmitting wireless information while other antenna elements may dedicated to receiving wireless information. In other cases, different antennas or subgroups of antennas can be selected at different times to either transmit or receive wireless RF signals. As noted below, in many constructions, certain antennas of the antenna array 108 can be operated as transmit antennas at the same time that certain other antennas of the antenna array 108 are operated as receive antennas. In other words, the base station 102 can be configured to operate the antenna array 108 as a full-duplex antenna array that is configured to simultaneously send and receive within the same band. Such constructions are described in greater detail below.

The antenna array 108 can be configured in a number of ways. In many embodiments, each antenna of the antenna array 108 is oriented to emit and/or receive RF signals of a particular polarity. In such constructions, each antenna can be paired with a co-located antenna oriented orthogonally. In this manner, the antenna array 108 can be formed form pairs of orthogonally oriented antennas to ensure that the portable electronic devices 104, 106 can receive signals emitted from the antenna array 108 regardless of the physical orientation of those devices.

In some embodiments, the pairs of antennas of the antenna array 108 of can be arranged in a planar grid. This is merely one example; any suitable arrangement of antennas can be used upon any suitable shape (e.g., concave shapes, parabolic shapes, and so on).

As noted with respect to many embodiments described herein the base station 102 can be configured to operate the antenna array 108 according to one or more beamforming techniques. Specifically, the base station 102 can be configured to implement either or both BB beamforming or RF beamforming. In many examples, hybrid BB/RF beamforming may be used. Generally and broadly, as may be appreciated by a person of skill in the art, beamforming may be leveraged to direct a substantial portion of RF energy emitted from the antenna array 108 in a direction that follows a path that terminates at a target UE, such as the portable electronic device 104 or the portable electronic device 106. As may be appreciated, and as shown in FIG. 1, the path may not be a line-of-sight path; in many practical implementations, the base station 102 may be configured to direct RF energy into local radio environment 110, targeted toward an environmental object 112 that, in turn reflects the beam toward UE, such as the portable electronic device 104.

More specifically, as understood by a person of skill in the art, beamforming operations modulate the phase, amplitude, and/or other signal characteristics of an RF signal applied to a particular antenna element of the antenna array 108. Similarly, RF signals applied to adjacent antenna elements are likewise configured such that a constructive interference pattern is generated along a particular, selected, path.

For example, in one embodiment, two antenna elements are positioned adjacent to one another. If each element is supplied with the same RF signal (e.g., same amplitude, phase, and so on), half of the energy of that RF signal will be emitted from the first antenna and half of the energy of the RF signal will be emitted from the second antenna. The energy emitted from both antennas is in phase and thus will constructively interfere where emitted RF energy overlaps. This constructive interference pattern is typically referred to as the "main lobe" of the antenna pair. In this same construction, if a phase difference is introduced between the first and second antenna elements, the interference pattern changes shape and, correspondingly, the main lobe propagates in a different direction. In this manner, phase control can be used to direct the main lobe emitted from the antenna pair (of this example) in any suitable angle.

This concept is extended to larger arrays of antennas, such as the antenna array 108. In such implementations, dozens or hundreds of antennas can be fed with independent RF signals, each of which may have separate phase and/or amplitude. In some cases, the antenna array 108 can be subdivided into subarrays; each subarray can receive, as input, a single input RF signal.

However, as may be readily appreciated and as described above, phase and/or amplitude control for beamforming/beamsteering purposes is not suitable for all implementations. In particular, as known to persons of skill in the art, analog beamsteering/beamforming is generally only suitable to direct one beam at a time from an antenna array, such as the antenna array 108. In other words, for the base station 102 to communicably couple to each of the portable electronic device 104 and the portable electronic device 106, time and/or frequency multiplexing techniques must be employed. For this reason, analog beamsteering is often associated with, and referred to as a single user antenna control technique. More commonly, this is referred to as a single-user multi-input multiple-output system, or "SU-MIMO."

Accordingly, as noted above, the base station 102 may also be configured to implement one or more digital beamforming/beamsteering techniques that modify and combine an arbitrary number of signals in the digital domain to generate unique signals that can be applied to individual antenna elements of the antenna array 108, thereby steering a portion of energy emitted from the antenna array 108 to the portable electronic device 104, and a portion of the energy emitted from the antenna array 108. For this reason, digital beamsteering is often associated with, and referred to as a multiple user antenna control technique. More commonly, this is referred to as a multi-user multi-input multiple-output system, or "MU-MIMO."

Although a communication system such as the wireless communication system 100 can be implemented as either a SU-MIMO or MU-MIMO system, for simplicity of description and illustration, the embodiments that follow reference an implementation supporting multiple users. Namely, the embodiments that follow reference transceiver devices configured to perform both analog beamforming and digital beamforming. In typically implementations, this technique is referred to as hybrid digital/analog beamforming.

As noted above, in many embodiments, the base station 102 and the portable electronic device 104, 106 are configured for in-band full duplex operation. In other words, the base station 102 can be configured to transmit signals, steered toward the portable electronic device 104, over the same frequencies and channels used by the portable electronic device 104 to transmit signals to the base station 102 (and/or the portable electronic device 106). To enable such communication, a number of self-interference cancellation techniques are described herein, some or all of which may be implemented in either or both the base station 102 and the portable electronic device 104.

For example, in some embodiments, null steering can be used in either the base station 102 or the portable electronic device 104 to direct a null region of an emission pattern of a set of transmit antennas toward a set of receive antennas of the same transceiver device. In other cases, the base station 102 and/or the portable electronic devices 104, 106 can include one or more self-interference cancellation filters that couple transmit chains to receive chains within the same transceiver device so that signals transmitted by that device are cancelled from signals received by that device. In yet further examples described in greater detail below, the base station 102 and/or the portable electronic devices 104, 106 can include one or more self-interference cancellation filters that couple baseband transmit data to baseband received data. In yet further examples, one or more trained learning algorithms (e.g., a neural network, support vector machine, and so on) can be leveraged to augment behavior of one or more self-interference filters and/or one or more beamforming controllers.

These techniques and structures described herein can be operated cooperatively and/or independently to mitigate self-interference effects that otherwise render full-duplex in-band communication impossible.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
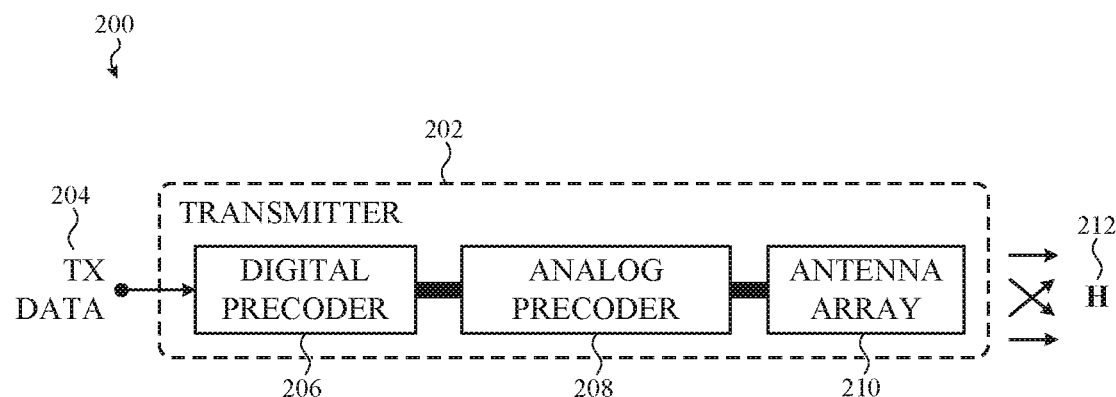
FIG. 2A depicts a simplified signal flow diagram of a transmitter of a wireless communication system, as described herein.
Figure 2B:
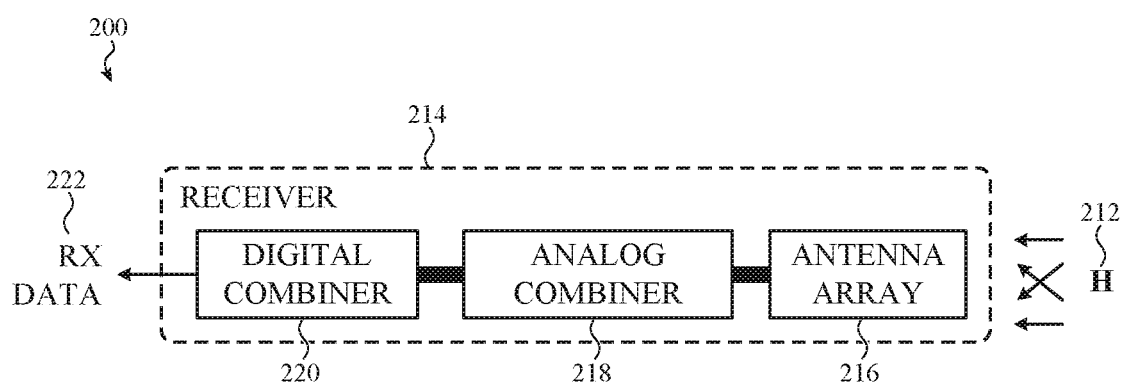
FIG. 2B depicts a simplified signal flow diagram of a receiver of a wireless communication system, as described herein.

Generally and broadly, FIGS. 2A-2B depict transmit and receive signal processing chains, collectively referred to as, simply "transmitter electronics" and "receiver electronics" that may be used in a transceiver as described herein.

In particular, FIG. 2A depicts a simplified signal flow diagram of a transmitter portion of a transceiver 200 of a wireless communication system, as described herein. The transmitter portion of the transceiver 200 is identified in the figure as the transmitter 202.

The transmitter 202 is configured to receive a data stream 204 that includes data to be transmitted to a remote or "target" device. In this manner, the transmitter 202 can be referred to as the "source device" and the remote transceiver intended to receive signals emitted by the transmitter can be referred to as the "endpoint device" or the "target device."

The transmitter 202 includes a baseband digital precoder 206 that is configured to modulate, modify, or otherwise adjust the data stream 204 for purposes of BB domain beamforming. The baseband digital precoder 206 provides digital output that can be converted to an analog signal (e.g., by a digital to analog converter) and thereafter modulated/up-converted into the RF domain and provided as input to an analog precoder 208 that, like the baseband digital precoder 206 is configured to modulate, modify, or otherwise adjust output of the baseband digital precoder 206 for purposes of RF domain beamforming.

Either or both the baseband digital precoder 206 and the analog precoder 208 can be configured to receive, as input, configuration parameters that define operations thereof. In many cases, such configuration parameters may be provided as a vector of coefficients. The coefficients can be used, in one example, to define how much phase delay is applied to a particular signal in the RF domain or the BB domain. Other examples are possible, but generally and broadly it may be appreciated that the baseband digital precoder 206 and the analog precoder 208 can each be configured to receive a unique set of values that, in turn, define operations of those precoders. In some cases, these values can be algorithmically determined, whereas in other cases these values can be selected from a set of predetermined/pre-calculated values stored in a database typically referred to as a codebook.

Output of the analog precoder 208 is provided to one or more power amplifiers (and/or other components) prior to being applied as input to individual antenna elements of an antenna array 210. Each of these elements are depicted as communicably, conductively, or otherwise coupled via bus, which is provided to illustrate that any suitable number of connections, RF chains, and so on can be used in different implementations. As noted above, a precoder as described here—also referred to as a beamforming controller—can be operated to steer one or more lobes (and/or one or more nulls) output from the antenna array 210 into the local RF environment 212.

The transceiver 200 can also include a receiver side that functions and/or operates as an endpoint device configured to receive wireless signals from a transmitter, such as the transmitter 202. FIG. 2B depicts such a construction. In particular, FIG. 2B depicts a simplified signal flow diagram of a receiver 214 of transceiver of a wireless communication system, as described herein.

The receiver 214 can also be configured for beamforming filtering, in the reverse order of operations as the transmitter 202. In particular, the receiver 214 can include an antenna array 216 configured to receive one or more signals from the local RF environment 212 that in turn can be provided as input to an RF domain combiner, identified in the figure as the analog combiner 218.

The analog combiner 218 can be configured to operate in much the same way as the analog precoder 208. In particular, signals received at different antenna elements of the antenna array 216 can be delayed (e.g., phase shifted) by a particular amount and then recombined. In some implementations amplitude may also be changed. In this manner, the analog combiner 218 can combine/overlay signals received at different antennas, thereby increasing signal to noise ratio.

For example, if the antenna array 216 includes two antennas, and a signal transmitted toward the antenna array arrives at an angle such that the first antenna receives the signal 1 ns before the second antenna receives the signal, the RF signals received at the first and second antennas have a 1 ns phase delay relative to each other. In this example, the first-received signal can be delayed by 1 ns before being combined with the second signal. As a result of this technique, the combined first and second signal will constructively interfere, effectively amplifying the originally-transmitted signal. A person of skill in the art understands this described technique of operating an analog combiner can be referred to as receive-side beamforming, a receiver beamforming filter, and so on.

The combined signal(s) output from the analog combiner 218 can be provided as input to a digital combiner 220. The digital combiner 220 can include one or more analog to digital converters and can be configured to adjust the received signal in the digital/BB domain in order to provide, as output received data 222.

As with precoders, the combiners of the receiver side of the transceiver 200 can be controlled by/informed by one or more vectors of values which may be determined and/or obtained/selected from a codebook.

These foregoing embodiments depicted in FIGS. 2A-2B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that the example embodiment depicted in FIGS. 2A-2B can be implemented in a number of ways. For example, as noted above, a transceiver can include both a transmitter side and a receiver side. The transmitter side and the receiver side can be configured to operate simultaneously or in a time, polarization, and/or frequency multiplexed manner.

Further, it may be appreciated that a transceiver that includes a transmitter side (such as the transmitter 202) and a receiver side (such as the receiver 214) can leverage the same antenna array or may leverage a different, dedicated, antenna array. In some embodiments a receive side antenna array can be positioned in a different physical location than a transmit side antenna array. In other cases, a receive side antenna array can be positioned adjacent to a transmit side antenna array. In still further examples, multiple arrays can be used for multiple purposes in a multiplexed manner. For example, in one implementation, a transceiver includes two antenna arrays. In this example, the transceiver can be configured to switch between antenna arrays at a given rate. For example, for a first period of time, the first antenna array may be dedicated to transmitting RF energy whereas in a second period of time, the first antenna array may be dedicated to receiving RF energy.

In yet further constructions, subarrays of an antenna array (or more than one antenna array) can be defined and coupled to transmit circuitry or receive circuitry.

In some cases, a transmit side antenna array can include more antennas than a receive side antenna array. In other cases, a receive side antenna array may include more antennas than a transmit side antenna array.

In view of the foregoing examples, which are not exhaustive of antenna or transceiver configurations as described herein, a person of skill in the art may readily appreciate that any suitable shared or dedicated antenna array architecture may be used with a transmitter side and/or receive side of a transceiver as described here.

Further, although FIGS. 2A-2B depict embodiments in which a transmitter side and a receiver side implement hybrid digital/analog beamforming architecture, this is not required of all embodiments. In particular, some embodiments described herein can be operated with an analog beamforming architecture (either baseband or RF) or a digital beamforming architecture. Examples of these architectures are presented in FIGS. 3A-3C.

Figure 3A:
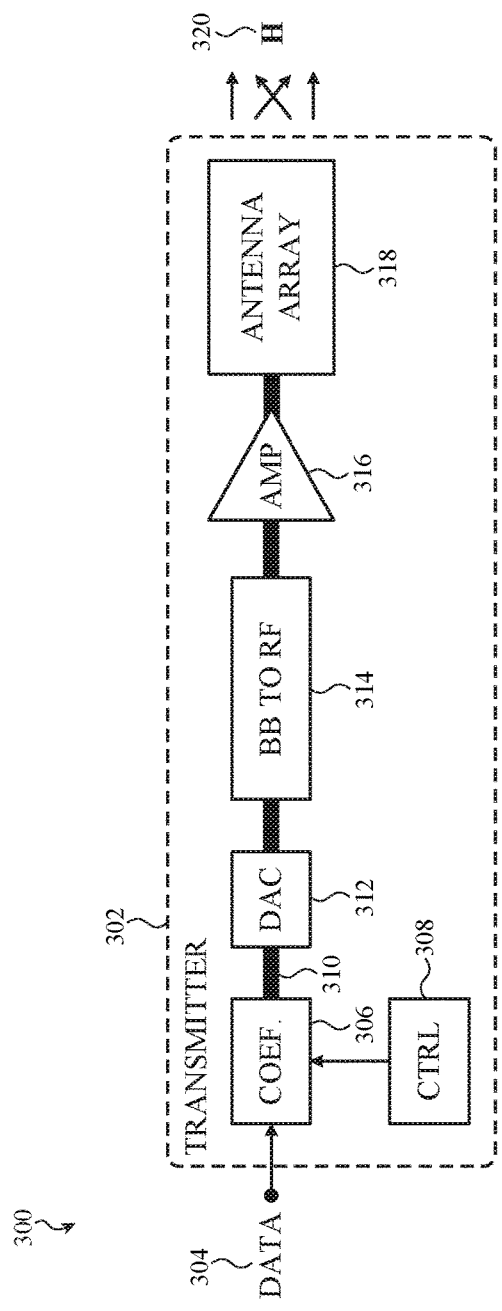
FIG. 3A depicts a simplified signal flow diagram of a digital baseband ("BB") precoder/digital beamforming controller of a transmitter of a wireless communication system, as described herein.

For example, FIG. 3A depicts a simplified signal flow diagram of a transmitter that includes a digital precoder only. In this construction, the transceiver 300 includes a transmitter 302 that receives a data stream 304 to transmit to an endpoint device, which may also be a transceiver such as described herein or may be a half-duplex device configured for one-way communication with the transceiver 300 (e.g., configured to operate only to receive signals transmitted by the transmitter 302).

In the illustrated construction, the data stream 304 is received at a precoder 306 that, like precoders described above, can be configured to receive as input one or more vectors of coefficients that define one or more operations of the precoder 306. The precoder 306 operates in the baseband, and as such, is typically a digital baseband precoder. More specifically, the precoder 306 is configured to modify the data stream 304 to provide a digital output that, when up-converted and provided as input to an antenna array, causes the antenna array to emit RF energy along a particular path. In other words, the operation of the precoder 306 defines, at least in part, a lobe pattern emitted by an antenna array of the transmitter 302. The lobe pattern can include a main lobe oriented along a path that terminates at the target receiver device (e.g., the path may be line of sight or may include one or more reflections from one or more objects in the RF environment), and one or more side lobes or null points oriented along other directions. In this manner, operation and configuration of the precoder 306 defines the beamforming and/or beamsteering operations/functions of the transmitter 302. More particularly, the vector of coefficients received as input to the precoder 306 defines operation of the transmitter 302.

As with other embodiments described herein, the vector provided as input to the precoder 306 can be provided/generated/accessed or otherwise obtained or selected by a precoder controller 308. The precoder controller 308 can be, or can include, any suitable computing device or memory structure configured to determine (or otherwise provide as output) a vector of digital values (which may be integer values, float values, or any other suitable scalar values). In this construction, when the precoder 306 receives a vector of values, its configuration changes and, correspondingly the lobe pattern emitted from the antenna array changes.

In this architecture, more generally and broadly, the precoder 306 is configured to receive the data stream as input (e.g., can be configured to receive digital data as input) and to provide digital values as output. These digital values are passed along a transmit chain, described below, to cause an antenna array to emit a differently-shaped or differently structured lobe pattern.

In particular, the precoder 306 can provide, as output via a bus 310, one or more streams of digital values as input to a digital to analog converter 312. The digital to analog converter 312 converts the digital output provided by the precoder 306 into an analog electrical signal (e.g., time-varying voltage, current, or power signal). In turn, the analog voltage signal can be provided to baseband to radio frequency converter 314 which, in turn provides output suitable for amplification by a power amplifier 316. Output from the power amplifier 316 is provided as input to an antenna array 318, such as described with respect to other embodiments presented herein. The antenna array 318 thereafter emits RF energy in a lobe pattern defined in substantial party by the precoder 306 into the local RF environment 320.

It may be appreciated that the embodiment shown in FIG. 3A is simplified. In particular, it may be appreciated that the depicted bus, the bus 310, is illustrated to convey that multiple independent chains and/or communication channels can be defined from the precoder 306 to the antenna array 318, as appropriate for particular implementations. For example, in many embodiments, a separate and discrete power amplifier may be used for each RF chain.

Further it may be appreciated that the precoder controller 308 can perform and/or may implement one or more operations in order to determine, modify, or select the vector applied as input to the precoder 306 to change and operation of the precoder 306 and, in turn, to change the lobe pattern emitted from the antenna array 318. For example, in many embodiments, a beamtraining operation (e.g., to determine and/or estimate channel state information) may be performed to determine a path or a set of paths to an intended receiver device. In some cases, beamtraining may consist of iteratively selecting different vectors from a codebook, and eventually selecting a vector that provides the strongest signal at the receiver device. In other cases, certain channel information (e.g., information about the local RF environment 320) may be known. In such cases, beamtraining may not be required; a vector can be determined based on known or otherwise determined or estimated channel state information.

In still further implementations, the precoder 306 can be configured to generate a lobe pattern from the antenna array 318 that serves multiple endpoint/receiver devices.

It may be appreciated that the foregoing described example embodiments and use cases are simplified and that in many constructions additional components, elements, signal processing elements, analog and digital elements may be included.

Figure 3B:
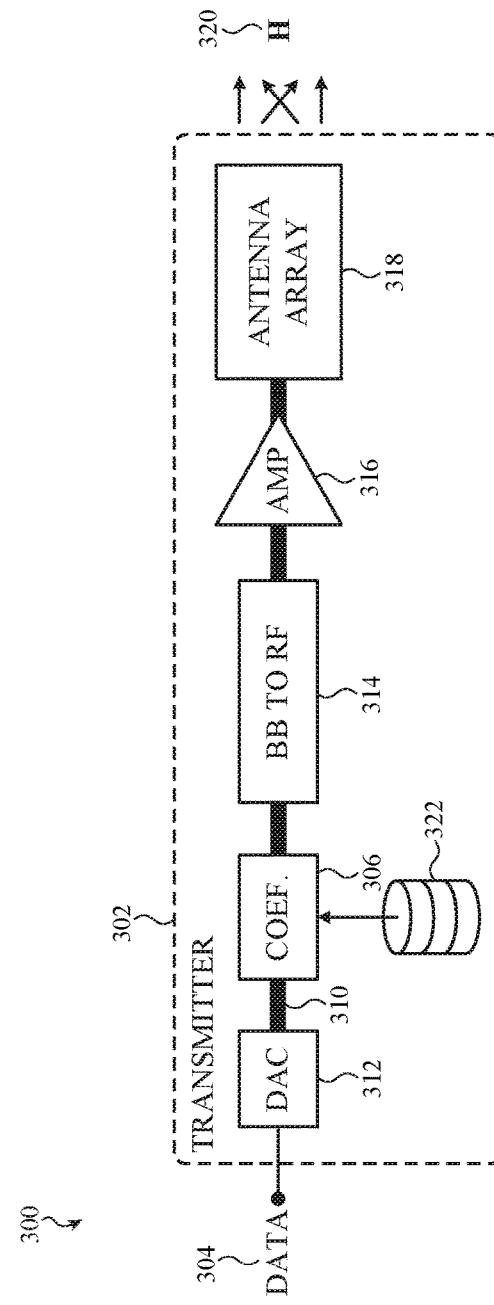
FIG. 3B depicts a simplified signal flow diagram of an analog BB precoder/analog BB beamforming controller of a transmitter of a wireless communication system, as described herein.

Further still, it may be appreciated that in some embodiments analog beamforming/analog precoding may be used. FIG. 3B depicts a simplified signal flow diagram of an analog baseband precoder/analog beamforming controller. In this construction, which may be configured in a similar manner as shown in FIG. 3A, the precoder 306 receives input from the digital to analog converter 312 which receives the data stream 304 as input. In this construction, the precoder 306 may be configured to receive configuration parameters/a vector from a codebook 322, although this is not required of all embodiments. This construction differs from FIG. 3A in that the precoder 306 operates on analog baseband data. In such examples, the precoder 306 in FIG. 3B may include one or more attenuators, one or more phase shifters, and so on. Each independent phase shifter or attenuator can be configured to attenuate or phase shift (respectively) one signal line relative to another signal line based on one respective entry in the vector/code supplied by the codebook 322. In other cases, a codebook 322 may be substituted for a fully-digital controller, such as the precoder controller 308 shown in FIG. 3A.

Figure 3C:
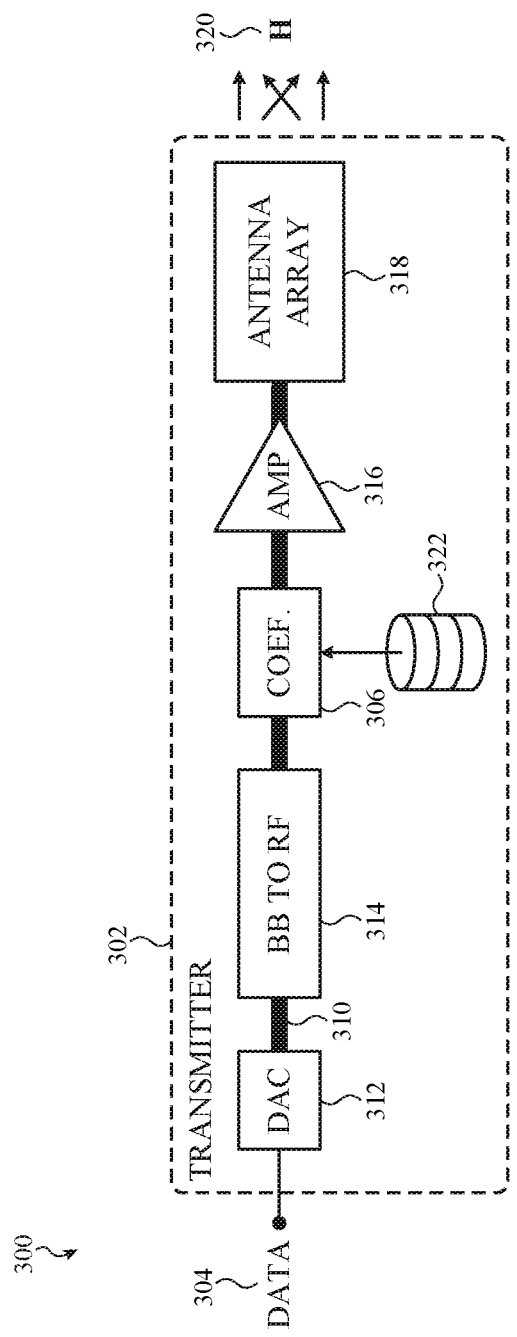
FIG. 3C depicts a simplified signal flow diagram of an analog radio frequency ("RF") precoder/analog RF beamforming controller of a transmitter of a wireless communication system, as described herein.

In another construction, analog RF beamforming may be used. FIG. 3C depicts a simplified signal flow diagram of an analog RF.

FIG. 3C depicts a simplified signal flow diagram of an analog RF precoder/analog beamforming controller. In this construction, which may be configured in a similar manner as shown in FIGS. 3A-3B, the precoder 306 receives input from the baseband to radio frequency converter 314 which receives as input analog output of the digital to analog converter 312. In this construction, as with the foregoing constructions, the precoder 306 may be configured to receive configuration parameters/a vector from a codebook 322 (and/or a precoder controller such as the precoder controller 308), although this is not required of all embodiments. This construction differs from FIGS. 3A-3B in that the precoder 306 operates on analog RF data. In such examples, the precoder 306 in FIG. 3C may include one or more attenuators, one or more phase shifters, and so on. As with the analog BB precoder described in reference to FIG. 3B, each independent phase shifter or attenuator can be configured to attenuate or phase shift (respectively) one signal line relative to another signal line based on one respective entry in the vector/code supplied by the codebook 322. In other cases, a codebook 322 may be substituted for a fully-digital controller, such as the precoder controller 308 shown in FIG. 3A.

These foregoing embodiments depicted in FIGS. 3A-3C and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in hybrid architectures, a single precoder controller can be configured to mutually control operations of both a baseband precoder and an RF precoder. This construction can be leveraged for self-inference cancellation, as described in greater detail below.

Figure 4A:
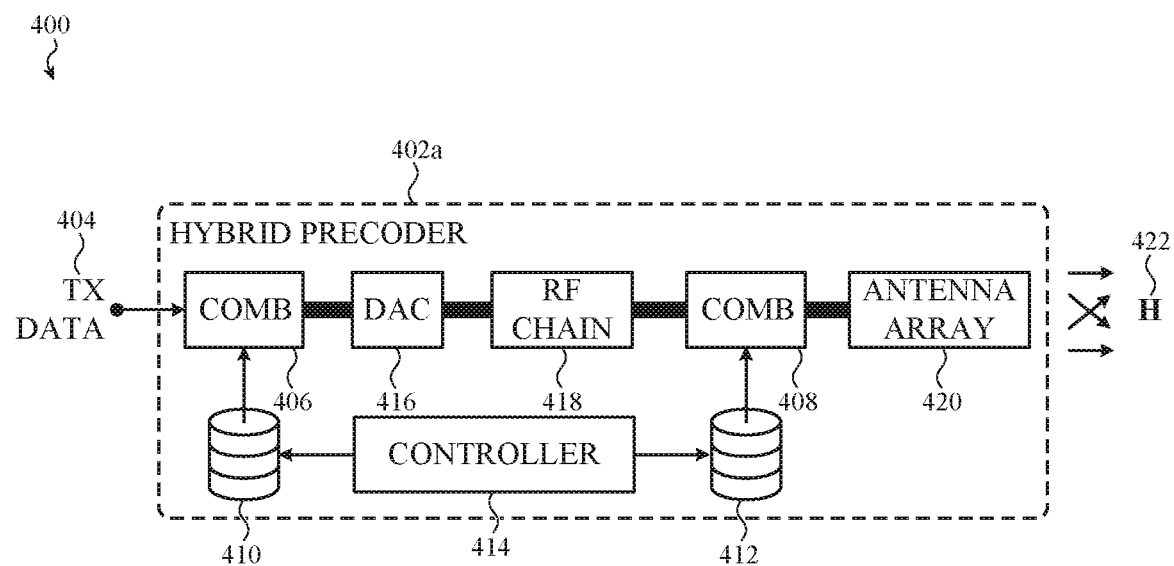
FIG. 4A depicts a simplified signal flow diagram of a hybrid digital/analog beamforming controller of a transmitter of a wireless communication system as described herein.

FIG. 4A depicts a simplified signal flow diagram of a hybrid digital/analog beamforming controller of a transmitter of a wireless communication system as described herein.

In particular, the transceiver 400 can include a hybrid precoder chain 402a that, like other embodiments described herein, receives a data stream 404 as input. The data stream 404 can be received by a baseband precoder 406 which, as described above, can modify one or more characteristics or parameters of the data stream 404 in order to define a particular lobe pattern suitable to establish a communication link with a remote device, remote transceiver, or other endpoint device.

As noted above, the hybrid precoder chain 402a implements a hybrid architecture and as such also includes an RF precoder 408. As with other embodiments described herein, the RF precoder 408 can be configured to modify—in the RF domain—one or more characteristics or parameters of the up-converted baseband signal output from the baseband precoder 406.

Both the baseband precoder 406 and the RF precoder 408 can be communicably coupled to one or more respective codebooks and/or one or more precoder controllers. In particular, as illustrated, the baseband precoder 406 receives configuration parameters (e.g., a vector with coefficients defining operation(s) of the baseband precoder 406) from a memory structure 410 and the RF precoder 408 receives configuration parameters from a memory structure 412. Each of these memory structures, which can include persistent memory, working memory, databases, virtual data structures, shift registers, or any other suitable physical or virtual memory structure can be communicably coupled to, and controlled by, a mutual precoder controller 414, described in greater detail below.

The hybrid precoder chain 402a couples output of the baseband precoder 406 into an input of a digital to analog converter 416. Analog output of the digital to analog converter 416 can be provided as input to an appropriate RF chain which can include one or more up-converters, filters, amplifiers, and so on. Collectively, any component that may form a portion of an RF chain configured to receive baseband analog data and to output an RF signal is represented as the RF chain 418. The RF chain 418 provides output that is received as input to an antenna array 420 that, in response to the signal(s) received from the RF chain 418, can generate a lobe pattern into the local RF environment 422.

As noted above, the lobe pattern generated by the antenna array 420 is defined, at least in part, by the baseband precoder 406 and the RF precoder 408 which, in turn are controlled by the mutual precoder controller 414.

The mutual precoder controller 414 can be configured to select configuration parameters for both the baseband precoder 406 and the RF precoder 408. In particular, in many embodiments the mutual precoder controller 414 can be configured to leverage known channel information (e.g., obtained by beamtraining, received from another device within the same RF environment, and so on) to find or estimate optimal configuration parameters for both BB and RF precoders. For example, in one construction, an orthogonal matching pursuit algorithm ("OMP") can be leveraged by the mutual precoder controller 414.

The OMP algorithm can receive, as input (among other values or configuration parameters, such as RF chain counts, or antenna counts), initial values for each of the baseband precoder 406 and RF precoder 408. Therewith, the OMP algorithm can iteratively determine combinations of configuration parameters that result in the highest inner product until a stop condition is met, or iteration has completed. It may be appreciated by a person of skill in the art that this is merely one, simplified, example operation of the mutual precoder controller 414—other algorithms and operational configurations are possible.

Regardless of configuration, the mutual precoder controller 414 is configured to select configuration parameters for both the baseband precoder 406 and the RF precoder 408 that minimize self-interference received at a receive co-located (e.g., within the same transceiver device) with the hybrid precoder chain 402a.

For example, the mutual precoder controller 414 can be configured to direct a null toward receiver circuitry. In other words, the mutual precoder controller 414 may be configured to operate the antenna array 420 in a manner that generates a lobe pattern that minimizes RF energy emitted toward the receiver electronics.

In a more specific phrasing, the mutual precoder controller 414 can determine configuration parameters for the baseband precoder 406 and the RF precoder 408 based on an initial assumption that the interference channel that beams should be directed to avoid is a channel defined between the transmitter and the receiver of the same transceiver device.

As a simple example, a conventional transceiver leveraging hybrid beamforming may select a path to an endpoint device using an algorithm that is configured to optimize for on the signal to noise plus interference radio ("SINR"). This path may be one of many paths that exist between a transmitter and the endpoint device.

By contrast, embodiments described herein operate the mutual precoder controller 414 in a different manner. In particular, the mutual precoder controller 414 is configured to select a path (or more than one path) that minimizes interference back to the transceiver's own receiver circuitry.

To visualize such a construction, an example is provided. In this example, two transceiver devices are operated in an RF environment that includes one or more RF reflective surfaces. A small RF reflective surface sits between the transceiver devices, and is sized such that a portion of RF energy emitted toward the surface is reflected back to the source of that RF energy. In this example, the first transceiver, operating a hybrid beamforming architecture, may determine (e.g., via beamtraining or another method) that the best path between the first transceiver and the second transceiver is line of sight, toward the small RF reflective surface. In this conventional construction, RF energy emitted by the first transceiver is reflected from the surface back to the first transceiver. This reflected energy is self-interference.

By contrast, embodiments described herein optimized in a different manner. Continuing the example provided above, the mutual precoder controller 414 may determine that a path that directs a beam toward a different reflective surface in the local RF environment avoids illuminating the small RF reflective surface altogether and, as a result, reduces and/otherwise mitigates self-interference.

The foregoing example is understood to be simplified; in a practical application of the embodiments described herein, and in particular those related to operation of the mutual precoder controller 414, path selection may be a more computational complicated task. However, by designing the mutual precoder controller 414 to prioritize path design and/or construction in a manner that reduces self-interference, full-duplex in-band communication can be enabled. In particular, as noted above, the mutual precoder controller 414 can be configured to prioritize lobe patterns that steer nulls toward the receiver and/or can be configured to prioritize paths that minimize self-interference.

In further embodiments, receiver electronics of a transceiver can be likewise configured to prioritize paths that avoid self-interference introduced by transmitter electronics of the same transceiver device. In a simple, non-limiting phrasing, a receiver device can be configured to prefer channels (and/or may attempt to communicate to a remote device transmitting a signal to that receiver, for example during a beamtraining operation) that avoid interference created by the transmitter co-located with that receiver device.

Figure 4B:
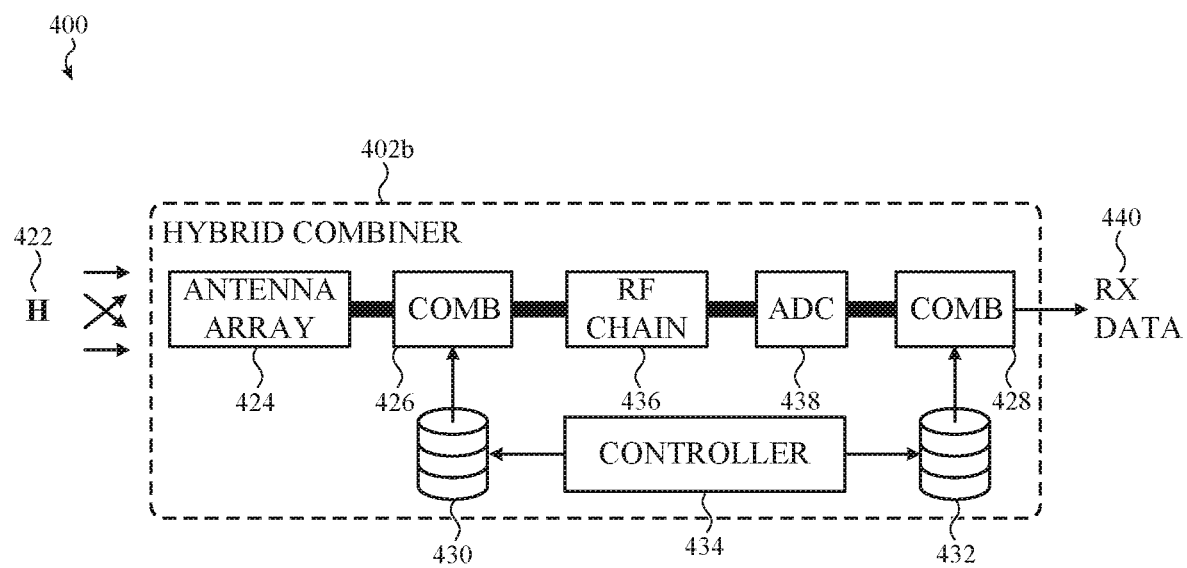
FIG. 4B depicts a simplified signal flow diagram of a hybrid digital/analog beamforming controller of a receiver of a wireless communication system, as described herein.

For example, FIG. 4B depicts a simplified signal flow diagram of a hybrid digital/analog beamforming controller of a receiver of a wireless communication system, as described herein.

The receiver of the transceiver 400 includes a hybrid combiner chain 402b that is configured in a similar manner as the hybrid precoder chain 402a. In particular, the hybrid combiner chain 402b is configured to receive RF energy from the local RF environment 422 at an antenna array 424. The antenna array 424 is coupled via a bus (or other multi-line, multi-chain coupling structure) to an RF combiner 426. As with the hybrid precoder chain 402a shown in FIG. 4A, the hybrid combiner chain 402b also has a corresponding baseband combiner 428. Each of the RF combiner 426 and the baseband combiner 428 are configured to receive vectors, arrays, or other memory structures to define one or more operations thereof, such as what phase delays and/or amplitude modifications to perform to which signals at which time. As with the hybrid precoder chain 402a, the hybrid combiner chain 402b includes a memory structure 430 and a memory structure 432 that each store and/or otherwise provide these configuration parameters to the RF combiner 426 and the baseband combiner 428, respectively. A mutual combiner controller 434 is communicably and/or conductively coupled to each combiner and is configured to control operations thereof.

As with the hybrid precoder chain 402a, the hybrid combiner chain 402b also includes other elements and operational components, some of which are shown in the simplified view show in FIG. 4B. For example, output from the antenna array 424 is provided as input to the RF combiner 426. The RF combiner 426 provides as output input to an RF chain 436 configured to filter and/or downconvert RF signals output from the combiner to baseband. Output from the RF chain 436 is provided as input to an analog to digital converter 438 which is configured to output one or more digital values that can be provided as input to the baseband combiner 428.

The mutual combiner controller 434 can be configured to operate in much the same manner as described above with respect to the mutual precoder controller 414. In particular, the mutual combiner controller 434 can be configured to operate the baseband combiner 428 and the RF combiner in such a manner as to prioritize signals sent from directions along paths that do not contain substantial self-interference that originated from the transceiver device itself. For example, while beamtraining with another transceiver device, the mutual combiner controller 434 can prioritize a path, code, or other configuration that minimizes self-interference.

These foregoing embodiments depicted in FIGS. 4A-4B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it may be appreciated that a hybrid architecture such as described above can be controlled on either the transmitter side or the receiver side to reduce self-interference. In one example, a precoder controller or a combiner controller can be configured to prioritize a path through a local RF environment that minimizes self-interference to a minimum level, thereby enabling full-duplex in-band communication.

In another more general phrasing, embodiments described herein enable a frequency-selective fully digital beamforming architecture. In other words, the mutual controllers discussed above in reference to FIGS. 4A-4B can be operated to prefer and/or optimize for particular frequencies or bands that result in the lowest self-interference in a given RF environment. As a result of this construction, a transceiver device can minimize self-interference which, in turn, can enable that transceiver to simultaneously transmit and receive within the same bands of frequencies at the same time.

Figure 5A:
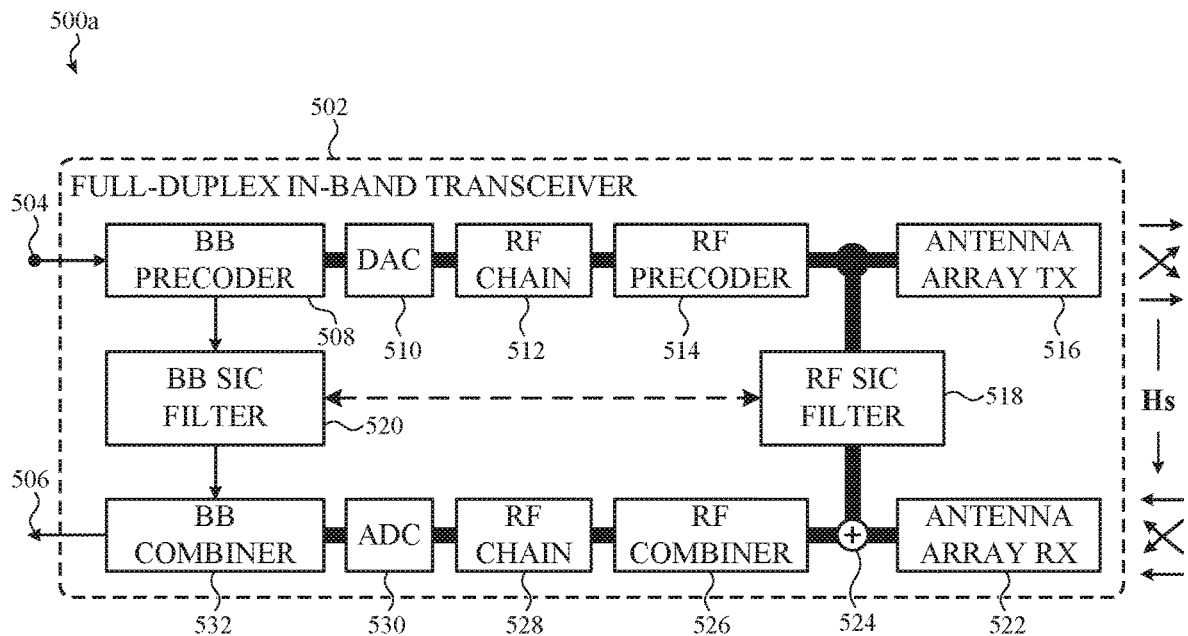
FIG. 5A depicts a simplified signal flow diagram of an in-band full duplex transceiver of a wireless communication system, as described herein.
Figure 5B:
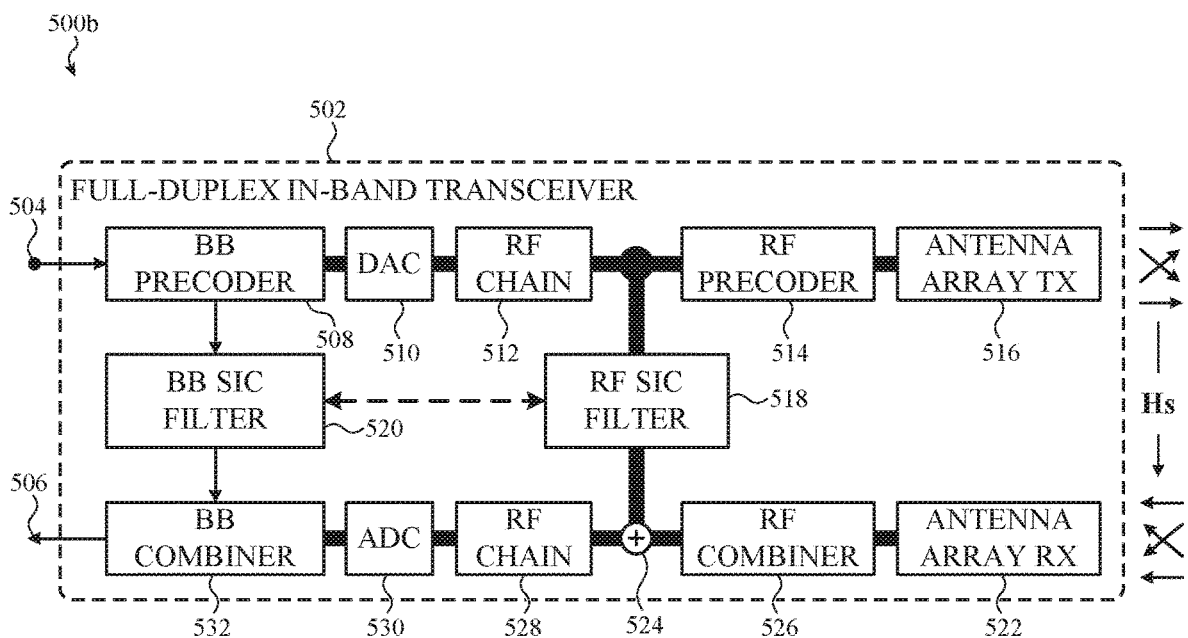
FIG. 5B depicts a simplified signal flow diagram of another in-band full duplex transceiver of a wireless communication system, as described herein.

In further embodiments, other methods of cancelling and/or reducing self-interference are possible. For example, generally and broadly, FIGS. 5A-5B depict an example architecture in which a transceiver as described herein can include one more self-interference filters. More specifically, these embodiments contemplate self-interference cancelation in either or both the RF domain or the BB domain.

For example, FIG. 5A depicts a simplified signal flow diagram 500a of an in-band full duplex transceiver 502 of a wireless communication system, as described herein.

As with other embodiments described herein, the in-band full duplex transceiver 502 includes a transmitter side and a receiver side. The transmitter side is configured to receive a data stream, convert that digital data into an analog baseband signal, up-convert the baseband signal into an RF signal, and apply the resulting RF signal to an antenna array as input. In response, the antenna array emits RF energy into the ambient, local, RF environment according to a particular lobe patter. The lobe pattern emitted from the antenna array is defined, as noted above, by one or more precoders, which may operate in either the digital or analog domain.

More specifically, the in-band full duplex transceiver 502 includes a transmit side that is configured to receive a data stream at a digital input 504. The digital input 504 can be communicably coupled to any signal source, such as a backhaul in the case of a base station or such as a processor in the case of a personal electronic device. The digital input 504 can be configured to receive digital data according to any form or format. The digital input 504 may be an optical input or a conductive input.

The in-band full duplex transceiver 502 also includes a receive side that is configured to receive one or more RF signals from the local RF environment, to down-convert those signals into baseband signals, and to convert those baseband signals into digital data that may be provided to another component or system via a digital output 506. The digital output 506 can be communicably coupled to any electronic device or network, such as a backhaul in the case of a base station or such as a processor in the case of a personal electronic device. The digital output 506 can be configured to transmit digital data according to any form or format. In many embodiments, the transmitted digital data output from the digital output 506 is provided as a data stream. As with the digital input 504, the digital output 506 may be an optical output or a conductive output.

Regarding the transmitter side of the in-band full duplex transceiver 502, the digital input 504 can be communicably and/or conductively coupled either directly or indirectly to an input of a baseband precoder 508 that feeds its output to a digital to analog converter 510 configured to output an analog signal. As with other embodiments described herein the baseband precoder 508 is configured to perform one or more beamforming operations, such as those described above with reference to FIGS. 4A-4B. More specifically, the baseband precoder 508 may be configured to output signals to the digital to analog converter 510 that, when up-converted by an RF chain 512 and supplied as input to an antenna array, steer at least one lobe or at least one null output from the antenna array in a particular direction in the local RF environment that minimizes self-interference back to the receive side of the in-band full duplex transceiver 502. More specifically, the baseband precoder 508 can be configured as described above; this description is not repeated.

In many construction, output from the RF chain 512 can be modified by an RF precoder 514. As with the baseband precoder 508, the RF precoder 514 can be configured to output signals to the antenna array 516 that steer at least one lobe and/or at least one null output form the antenna array 516 in a particular direction that minimizes self-interference back to the receive side of the in-band full duplex transceiver 502. Similar to the baseband precoder 508, it may be appreciated that the RF precoder 514 can be configured as described above; this description is not repeated.

As noted above, the in-band full duplex transceiver 502 also includes a receive side configured to receive one or more signals from the ambient RF environment and to convert those signals into one or more data streams that may be output via the digital output 506. In addition, the in-band full duplex transceiver 502 may include one or more self-interference filters to leverage information known about what signal(s) the transmitter side is transmitting to cancel or mitigate portions of those signals received by the receive side of the in-band full duplex transceiver 502. As illustrated, two self-interference cancelation filters are shown—a first is identified as the RF self-interference cancellation filter 518 and a second is identified as the baseband self-interference cancellation filter 520.

More specifically, the receiver side of the in-band full duplex transceiver 502 includes an antenna array 522 similar to the antenna array 516. The antenna array 522 can include the same or a different number of antennas as the antenna array 516. In some cases, the antenna array 516 and the antenna array 522 may be the same antenna array, although this is not required of all embodiments.

Output from the antenna array 522 is provided as input to a junction 524. In some examples, the junction 524 may be referred to as an RF combiner, but for an abundance of clarity and to functionally separate descriptions and operations of digitally-controlled combiners associated with beamforming operations, element 524 depicted in FIG. 5 is referred to as a junction 524.

The junction 524 can be configured to merge, in the RF domain, a signal output from the RF self-interference cancellation filter 518 with a raw RF signal received from the antenna array 522. The function and operation of the junction 524 and the RF self-interference cancellation filter 518 are described in greater detail below.

Output from the junction 524 is provided as input to an RF combiner 526. As with the combiners described above, the RF combiner 526 can be configured to combine signals in a manner (e.g., with particular phase delays and so on) in a manner that minimizes self-interference. Similar to the precoders described above, it may be appreciated that the RF combiner 526 can be configured as described above; this description is not repeated.

Output from the RF combiner 526 is provided as input to an RF chain 528 that is configured to down-convert the RF signals output from the junction into a baseband signal which, thereafter, can be converted into a digital signal by an analog to digital converter 530. Output from the analog to digital converter 530 is provided as input to a baseband combiner 532 that, like the RF combiner 526 can be configured to function as a portion of a beamforming filter; this description is not repeated.

Output from the baseband combiner 532 is provided as digital output via the digital output 506.

As a result of this construction, the in-band full duplex transceiver 502 can be configured to leverage its own transmit signal for cancellation purposes. For example, in one embodiment, the in-band full duplex transceiver 502 is operated in an RF environment in which the receive side receives a single "echo" of self-interference at a particular delay. In this example, the RF self-interference cancellation filter 518 can be configured to apply a phase shift to at least one signal it receives from the RF precoder 514. The phase shift may be selected to be precisely equal to the delay of the echo received by the receive side in the local RF environment. In addition, the RF self-interference cancellation filter 518 can be configured to invert the phase delayed signal. In this manner, and as a result of this technique, a single echo can be canceled at the junction 524.

A person of skill in the art will readily appreciate that "single-echo" RF environments are uncommon. As such it may be appreciated that in many practical applications, the RF self-interference cancellation filter 518 may be configured to apply multiple delays and/or multiple phase shifts to multiple different signals output from the RF precoder 514 in order to cancel as many echoes of self-interference that may be present in a particular environment. For mmWave implementations, the number of echoes may be smaller than lower-frequency implementations and, as such, the RF self-interference cancellation filter 518 may enjoy a simpler design for mmWave implementations.

In some examples, the RF self-interference cancellation filter 518 can perform one or more autocorrelation or cross correlation operations with signals received at the antenna array 522 to precisely determine what multipath effects can and should be canceled in the RF domain.

In other cases, the RF self-interference cancellation filter 518 can be implemented as a completely analog filter. In particular, the RF self-interference cancellation filter 518 can include an array or matrix of individual phase shifters or amplitude adjusters that coupled individual signal lines driving individual antennas or subgroups of the antenna array 516 to individual signal lines received from individual antennas or subgroups of the antenna array 522.

In many cases, the baseband self-interference cancellation filter 520 can be configured to operate with the RF self-interference cancellation filter 518. For example, in some cases, a machine learning algorithm and/or other trained algorithm can receive, as input, the digital input signal, the RF counterpart to that signal, an RF receive signal, and/or a received BB signal. In such examples, the algorithm may be configurable to determine optimal parameters for the baseband self-interference cancellation filter 520 and/or the RF self-interference cancellation filter 518 in order to mitigate self-interference to the largest extent. Such a learning algorithm can be implemented in a number of suitable ways, but in one example is implemented as a neural network trained in an manner that presumes that the only interference present in an RF environment originates from the transceiver device itself.

In a more simple phrasing, a machine learning algorithm (which can also be referred to as a predictive model, an artificial intelligence instance, and so on) can be trained to select parameters for both baseband and RF self-interference filters in order to minimize effects of self-interference when operating in full-duplex communication modes.

The foregoing example embodiment described in reference to FIG. 5A is merely one example and it may be appreciated that other embodiments can be constructed or architected in any suitable manner. In particular, it may be appreciated that self-interference filters can receive input from any suitable location or signal source within a transceiver, as described herein. For example, FIG. 5B depicts a simplified signal flow diagram 500*b* depicting the in-band full duplex transceiver 502 in which the RF self-interference cancellation filter 518 receives input from the RF chain 512 instead of the RF precoder 514.

More generally and broadly, it may be appreciated that a machine learning controller and/or a precoder controller and/or a combiner controller can be configured to receive information from, and/or signal input from, any suitable portion of a transceiver transmit side or receiver side.

These foregoing embodiments depicted in FIGS. 5A-5B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly it may be appreciated that the foregoing embodiments describe and reference various techniques for minimizing self-interference when operating a transceiver in full-duplex modes. In some cases, beamforming controllers on both the transmitter side (e.g., precoders) and the receive side (e.g., combiners) can be used to prefer communication paths (e.g., channels) that avoid interference as much as possible and/or that are configured to generate lobe patterns that direct nulls toward receiver side electronics or antenna arrays.

In addition, the foregoing embodiments contemplate self-interference filters that operate to mitigate self-interference based on information known about signals already-transmitted by a transmitter side of the transceiver. In further implementations of these embodiments, machine learning tools can be leveraged to select optimal parameters to cancel self-interference in either or both the RF or BB domains. Such self-interference can not only account for environmental self-interference (e.g., transmitted signals that reflect or otherwise arrive at receiver-side antenna arrays) but also internal self-interference or non-ideality effects, such as non-ideal operations of one or more filters, RF chain components, and so on.

Figure 6:
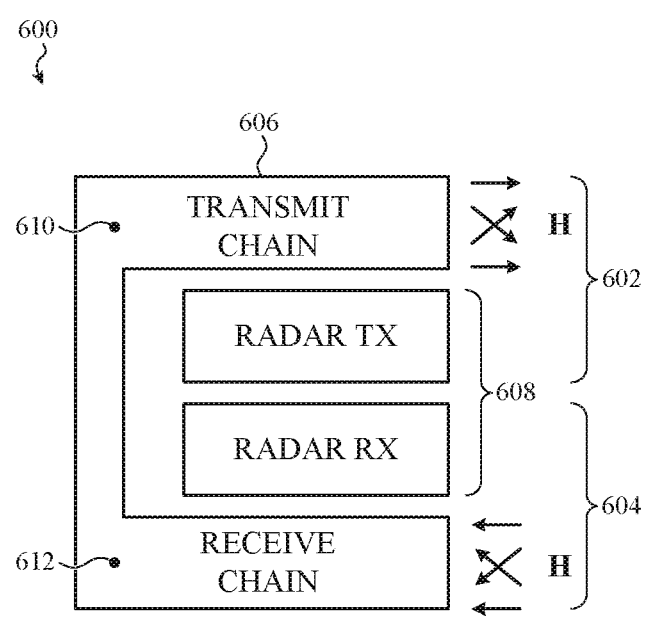
FIG. 6 depicts a simplified system diagram of an in-band full duplex transceiver co-located with another transceiver operating in the same band, system as described herein.

Each of these foregoing described techniques and architectures can be used individually or collectively to reduce self-interference effects to the same transceiver device. In other cases, these techniques can be leveraged to the inter-operation of multiple co-located electronic devices. For example, FIG. 6 depicts a simplified system diagram of an in-band full duplex transceiver co-located with another transceiver operating in the same band, system as described herein. In particular, a communications transceiver, such as described above can be operated with a mmWave radar array. In a more simple phrasing, FIG. 6 depicts a system of wireless transceivers (or a system of RF devices) that can co-operate in the same band by leveraging the systems and methods described herein.

Generally and broadly, the embodiment shown in FIG. 6 depicts an example arrangement in which an in-band full-duplex transceiver described herein is positioned relative to another electronic device in a manner that minimizes the effects of interference on the second device. More specifically, by co-locating transmitters and co-locating receivers, the above-described benefits of reducing self-interference at the receiver of the transceiver can be extended to the receiver side of the second electronic device.

More specifically, a simplified system diagram 600 shows two co-located mmWave systems. Each system includes a transmit side and a receive side. As noted above, to reduce interference with the second system by the first system, the transmit sides of both systems can be arranged together into a transmit pairing 602. Similarly, receive sides of both systems can be arranged together into a receive pairing 604.

The illustrated embodiment depicts a communications transceiver 606 co-operating with (in the same bands) a radar system 608. In particular, a transmit side 610 of the communications transceiver is physically positioned adjacent to a transmit side of the radar system 608. Similarly, the receive side 612 of the communications transceiver 606 is positioned physically proximate to the receive side of the radar system 608.

As a result of this positioning, the radar system 608 and the communications transceiver 606 can co-operate within the same bands, as the receive side of the radar system 608 is positioned physically close enough to the receive side 612 of the communications transceiver 606 so as to benefit from the self-interference cancellation effects achieved by intentional beamforming of signals emitted from the transmit side 610, such as described above.

These foregoing embodiments are presented merely as examples, and are not exhaustive of the configurations of constructions of a system configured to operate as described herein. In particular, more generally and broadly, a transceiver as described herein can be understood to include one or more beamforming controllers, one or more self-interference cancellation filters, and/or one or more processors, memory, or other electronics (e.g., which may implement one or more machine learning algorithms to assist with control of one or more operations described herein). An example simplified system diagram is provided in FIG. 7.

Figure 7:
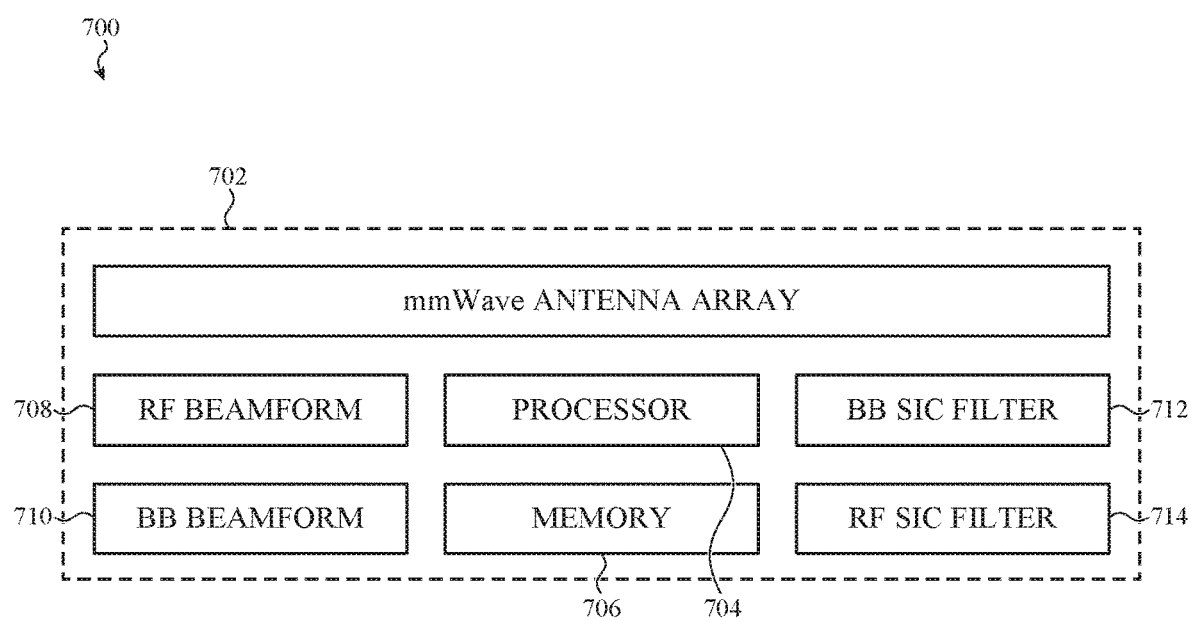
FIG. 7 depicts a simplified system diagram of an in-band full duplex transceiver, system as described herein.

In particular, FIG. 7 depicts a simplified system diagram of an in-band full duplex transceiver 700, system as described herein. The in-band full duplex transceiver 700 can be disposed within a housing 702 that can enclose and support one or more functional or operational components of the in-band full duplex transceiver 700.

In particular, disposed within the housing 702 the in-band full duplex transceiver 700 includes a processor 704 and a memory 706. The processor 704 can be any processor or controller as described herein including one or more baseband or RF combiner/precoder controllers, one or more mutual controllers, one or more self-interference filters, and so on. As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

The processor 704 is communicably coupled to the memory 706 which can include a working memory and/or a persistent memory. In one example construction, the processor 704 is configured to access a persistent/durable portion of the memory 706 to obtain one or more executable assets that can be loaded by the processor 704 into a working portion of the memory 706. By doing so, the processor 704 may cause to be instantiated one or more software applications that, when executed by the processor can be configured to perform, coordinate, schedule, monitor, or otherwise assist with one or more operations of the in-band full duplex transceiver 700 as described herein. For example, in one construction, the processor 704 is configured to instantiate a beamforming control application that controls baseband and/or RF precoders or combiners, such as the beamforming controllers 708, 710. In other cases, the processor 704 can be configured to instantiate a machine learning or predictive model application that is configured to control parameters of one or more self-interference filters, such as a baseband self-interference filter 712 or RF self-interference filter 714. In yet other cases, other application instances can be instantiated by the processor 704 in order These foregoing embodiments depicted in FIGS. 2A-7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 8:
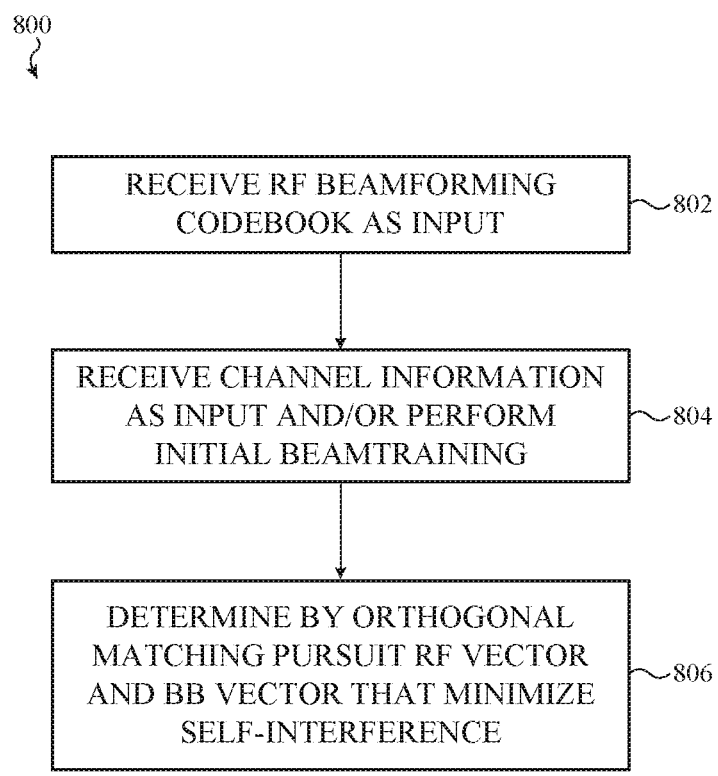
FIG. 8 is a flowchart depicting example operations of a method of using a hybrid digital/analog beamforming architecture for self-interference cancellation, such as described herein.

FIG. 8 is a flowchart depicting example operations of a method of using a hybrid digital/analog beamforming architecture for self-interference cancellation, such as described herein. The method 800 can be performed by any suitable hardware or software or combination thereof, such as the processor 704 depicted in FIG. 7.

The method 800 includes operation 802 in which a codebook is received as input. The codebook can include information useful for operating one or more analog RF beamforming precoders or combiners. The codebook can take any suitable form or format. In many examples, the codebook takes the form of a memory structure retrieved from a database, but this is not required of all embodiments.

The method 800 includes operation 804 in which channel information is received and/or a beamtraining operation is performed. Finally, at operation 806, the codebook data and/or channel information can be used as input to an orthogonal matching pursuit algorithm in order to determine configuration parameters for an analog precoder and/or a digital precoder. In many embodiments, these configuration parameters take the form of a vector, but this is not required of all embodiments.

As described above, this technique of determining configuration parameters for analog and digital sides of a transceiver's beamforming architecture can be leveraged to quickly and accurately determine a communication channel and/or path from transmitter to receiver that minimizes self-interference.

Figure 9:
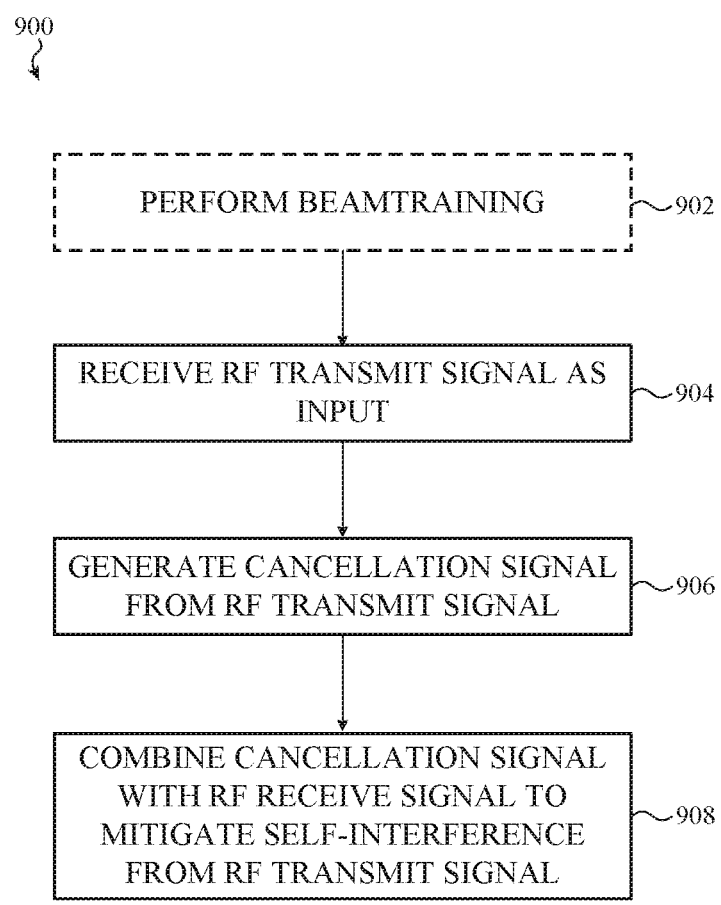
FIG. 9 is a flowchart depicting example operations of a method of using a self-interference cancellation filters for self-interference cancellation, such as described herein.

FIG. 9 is a flowchart depicting example operations of a method of using a self-interference cancellation filters for self-interference cancellation, such as described herein. As with the method 800, the method 900 can be performed by any suitable hardware or software or combination thereof, such as the processor 704 depicted in FIG. 7.

The method 900 optionally includes operation 902 at which a beamtraining operation can be performed and/or channel information and interference information can be obtained in another manner.

The method 900 also includes operation 904 at which one or more RF transmit signals are received as input to a self-interference cancellation filter. Next at operation 906, a cancellation signal can be generated from the RF transmit signals received at operation 904. Finally at operation 908, the cancellation signal can be combined with a received signal to mitigate effects of self-interference.

Figure 10:
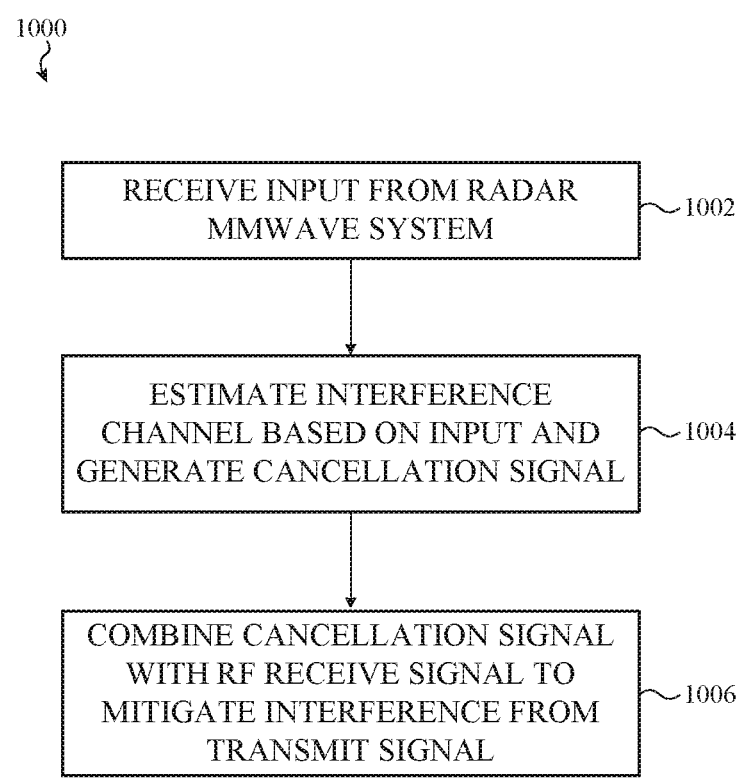
FIG. 10 is a flowchart depicting example operations of a method of controlling multiple co-located transceivers configured to transmit and/or receive in the same band, such as described herein.

FIG. 10 is a flowchart depicting example operations of a method of controlling multiple co-located transceivers configured to transmit and/or receive in the same band, such as described herein. The method 1000 can be performed by any suitable hardware or software or combination thereof, such as the processor 704 depicted in FIG. 7.

The method 1000 includes operation 1002 in which input from a radar system operating in the mmWave band is obtained. The input can obtain information about the local RF environment.

Next at operation 1004, the method 1000 advances to estimate channel interference based, at least in part, on the information obtained from the radar system at operation 1002. In addition, once the channel information is estimated, a cancellation signal can be generated.

Finally, the method 1000 advances to operation 1006 at which the cancellation signal is combined with a received signal to mitigate interference from a transmitted signal, otherwise (as noted above) referred to as self-interference.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A wireless transceiver for an in-band full duplex radio frequency ("RF") communication system, the wireless transceiver comprising:
   a transmit side comprising:
      a digital input receiving a first data stream as input;
      a first precoder receiving the data stream as input;
      a digital to analog converter receiving output of the first precoder as input;
      a first RF chain receiving output of the digital to analog converter as input;
      a second precoder receiving output of the RF chain as input; and
      a first antenna array receiving output of the second precoder as input and configured to emit RF energy in a selected band into a local RF environment;
   a receive side comprising:
      a second antenna array receiving RF energy in the selected band from the local RF environment;
      a first combiner receiving the received RF energy as input;
      a second RF chain receiving output of the first combiner as input;
      an analog to digital converter receiving output of the second RF chain as input;
      a second combiner receiving output of the analog to digital converter as input; and
      a digital output receiving output of the second combiner as input and configured to provide a second data stream as output; and
   a controller configured to instantiate an instance of a trained predictive model configured to provide, as output, configuration parameters for each of the first precoder and the second precoder, the controller configured to apply the configuration parameters to both the first precoder and the second precoder based on channel state information, the configuration parameters configured to minimize the RF energy emitted by the first antenna array that returns to the second antenna array.

2. The wireless transceiver of claim 1, comprising a self-interference cancellation filter coupling output of the second precoder to input of the first combiner.

3. The wireless transceiver of claim 2, wherein:
   the self-interference cancellation filter is a first self-interference cancellation filter; and
   the wireless transceiver comprises a second self-interference cancellation filter coupling output of the first precoder to input of the second combiner.

4. The wireless transceiver of claim 3, wherein the first self-interference cancellation filter cancels a first portion of self-interference and the second self-interference cancellation filter cancels a second portion of self-interference.

5. The wireless transceiver of claim 4, wherein the first self-interference cancellation filter introduces a phase shift to output of the second precoder.

6. The wireless transceiver of claim 4, wherein:

the configuration parameters are first configuration parameters and;

the controller is configured to apply second configuration parameters to the first self-interference cancellation filter and the second self-interference cancellation filter, the second configuration parameters configured to minimize the RF energy emitted by the first antenna array that returns to the second antenna array and is received at the first combiner.

7. The wireless transceiver of claim 6, wherein:

the instance of the trained predictive model is configured to provide the second configuration parameters as output.

8. The wireless transceiver of claim 7, wherein the instance of the trained predictive model comprises a neural network configured to receive as input at least one of the first data stream or the second data stream.

9. The wireless transceiver of claim 1, wherein the controller is configured to access a codebook to provide configuration parameters to the second precoder.

10. The wireless transceiver of claim 1, wherein the RF energy is emitted into the local RF environment by the first antenna array at at least one frequency between 1 GHz and 300 GHz.

11. The wireless transceiver of claim 1, wherein:

the configuration parameters are first configuration parameters; and the controller is configured to provide second configuration parameters to both the first combiner and the second combiner based on the channel state information, the second configuration parameters configured to minimize the RF energy emitted by the first antenna array that returns to the second antenna array.

12. The wireless transceiver of claim 1, wherein the second antenna array and the first antenna array are portions of a third antenna array.

* * * * *